(12) United States Patent
Katou

(10) Patent No.: US 10,025,682 B2
(45) Date of Patent: Jul. 17, 2018

(54) CONTROL SYSTEM AND PROCESSING METHOD THEREOF

(71) Applicant: FUJITSU LIMITED, Kawasaki-shi, Kanagawa (JP)

(72) Inventor: Yousuke Katou, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 156 days.

(21) Appl. No.: 15/164,293

(22) Filed: May 25, 2016

(65) Prior Publication Data
US 2016/0350193 A1 Dec. 1, 2016

(30) Foreign Application Priority Data
Jun. 1, 2015 (JP) ................. 2015-111316

(51) Int. Cl.
*G06F 11/20* (2006.01)
*G06F 11/00* (2006.01)

(52) U.S. Cl.
CPC .......... *G06F 11/2097* (2013.01); *G06F 11/00* (2013.01); *G06F 11/2038* (2013.01)

(58) Field of Classification Search
CPC ............. G06F 11/0757; G06F 11/2005; G06F 11/2017; G06F 11/2028; G06F 11/2033; G06F 11/2038; G06F 11/2046; G06F 11/2097; G06F 2201/805
USPC .................................................. 714/10–13
See application file for complete search history.

(56) References Cited

U.S. PATENT DOCUMENTS

| | | | |
|---|---|---|---|
| 6,138,248 A | 10/2000 | Saito et al. | |
| 6,408,399 B1* | 6/2002 | Baughman | G06F 11/2038 709/224 |
| 6,625,750 B1* | 9/2003 | Duso | G06F 11/2028 714/11 |
| 2011/0228668 A1* | 9/2011 | Pillai | G06F 11/2023 370/217 |
| 2013/0254571 A1 | 9/2013 | Tian | |
| 2013/0290763 A1 | 10/2013 | Katsumata | |
| 2014/0082311 A1* | 3/2014 | McNeeney | G06F 11/141 711/162 |

(Continued)

FOREIGN PATENT DOCUMENTS

JP 10-207855 8/1998
JP 2008-242701 10/2008
(Continued)

*Primary Examiner* — Joseph R Kudirka
(74) *Attorney, Agent, or Firm* — Staas & Halsey LLP

(57) ABSTRACT

A control system includes a first control device, a second control device, and a transfer storage unit. The first and second control devices execute processes. The first control device includes a first storage unit and a first processor. The first processor reflects state information in the first storage unit and the transfer storage unit. The first processor transmits, to the second control device, a start notification that causes the second control device to start an operation of the second control device. The second control device includes a second storage unit and a second processor. The second processor starts the operation of the second control device in response to reception of the start notification when the second control device is in a suspended state. The second processor reads the state information from the transfer storage unit. The second processor reflects the read state information in the second storage unit.

13 Claims, 27 Drawing Sheets

(56) References Cited

U.S. PATENT DOCUMENTS

2015/0234720 A1* 8/2015 Ohno .................. G06F 11/2007
                                                            714/11

FOREIGN PATENT DOCUMENTS

| JP | 2013-125493 | 6/2013 |
| JP | 2013-531822 | 8/2013 |
| JP | 2014-170477 | 9/2014 |
| WO | WO 2012/023200 A1 | 2/2012 |

* cited by examiner

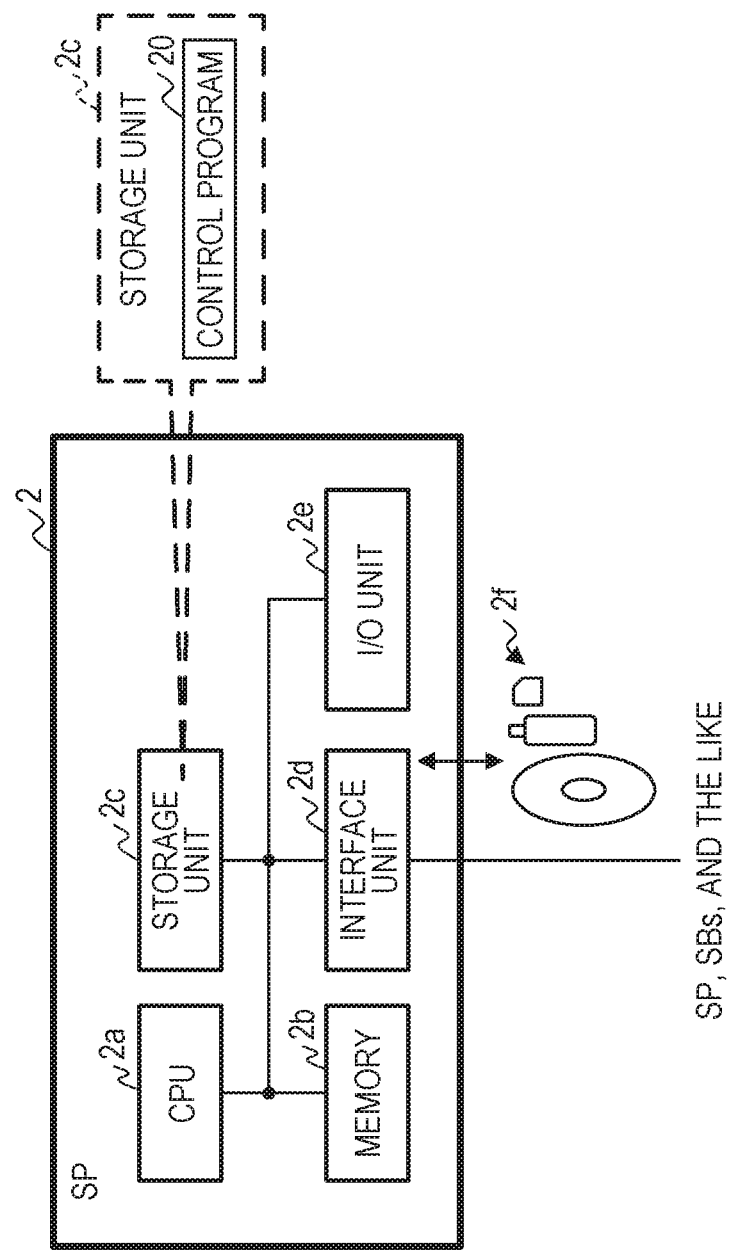

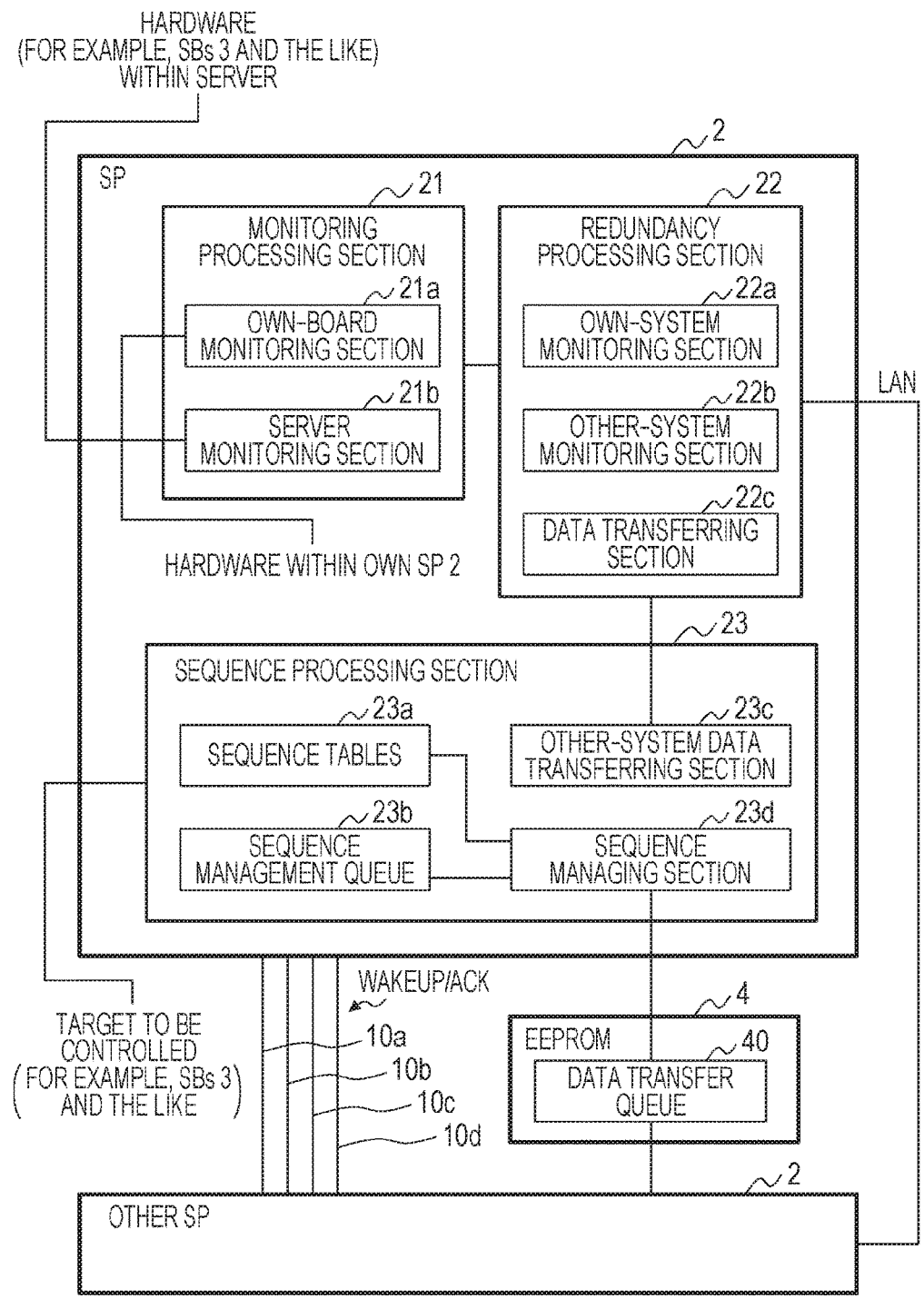

|  | FIELD NAME |
|---|---|
| HEADER PORTION | NUMBER OF SEQUENCE STEPS |
| DATA PORTION #0 | SEQUENCE STEP NUMBER |
|  | FUNCTION POINTER FOR SEQUENCE PROCESS EXECUTION FUNCTION |
|  | RESTART POINT AFTER SWITCHING OF ACTIVE SP |
|  | PARAMETER |
| DATA PORTION #1 |  |
| ⋮ |  |
| DATA PORTION #M |  |
| ⋮ |  |

|  | FIELD NAME |
|---|---|
| HEADER PORTION | HEAD ENTRY INDEX |
|  | TAIL ENTRY INDEX |
| DATA PORTION #0 | SEQUENCE STATE<br>· INVALID<br>· RUNNING<br>· HOLD<br>· SUSPENDED<br>· STOPPED<br>· CANCELLED |
|  | SEQUENCE ID |
|  | SEQUENCE TYPE |
|  | SEQUENCE STEP NUMBER |
|  | INFORMATION OF HARDWARE TO BE CONTROLLED |
| DATA PORTION #1 |  |
| ⋮ |  |
| DATA PORTION #N |  |
| ⋮ |  |

FIG. 6

| | FIELD NAME |
|---|---|
| HEADER PORTION | HEAD ENTRY INDEX |
| | TAIL ENTRY INDEX |
| DATA PORTION #0 | TYPE OF DATA TO BE TRANSFERRED<br>· SEQUENCE QUEUE<br>· REDUNDANT SYNCHRONIZATION DATA |
| DATA PORTION #0 | DATA TO BE TRANSFERRED |
| DATA PORTION #1 | |
| ⋮ | |
| DATA PORTION #i | |
| ⋮ | |

40

CONTROL SYSTEM AND PROCESSING METHOD THEREOF

CROSS-REFERENCE TO RELATED APPLICATION

This application is based upon and claims the benefit of priority of the prior Japanese Patent Application No. 2015-111316, filed on Jun. 1, 2015, the entire contents of which are incorporated herein by reference.

FIELD

The embodiment discussed herein is related to a control system and a processing method thereof.

BACKGROUND

An information processing system, for example, a server 100 illustrated in FIG. 28, may include boards (modules) that are called service processors (SPs) 200 as an example of control devices configured to control and monitor the server 100.

The SPs 200 may each include a central processing unit (CPU) 200a, a memory 200b, and the like. The SPs 200 are made redundant in order to maintain high availability so that the SPs 200 each include a role for an active SP or a standby SP. The redundant SPs 200 (SP 200-1 (SP#0) and SP 200-2 (SP#1) in the example illustrated in FIG. 28) are communicably connected to each other by a network such as a local area network (LAN). Each of the SPs 200 may transmit data and the like to another SP 200 through the LAN.

The active SP 200 (for example, the SP 200-1) controls and monitors hardware of various types such as system boards (SBs) 300 and the like through a bus switch 200h by an inter-integrated circuit (I2C) controller 200g included in a logical circuit such as a complex programmable logic device (CPLD) 200e or the like, for example.

The SBs 300 are an example of information processing devices and may each include a memory 300b and a CPU 300a for executing an operating system (OS) of the server 100, and the like. In the example illustrated in FIG. 28, the server 100 includes a number n (n is an natural number) of SBs 300-1 to 300-n, and the active SP 200-1 controls the SBs 300-1 to 300-n.

The standby SP 200 (for example, the SP 200-2) monitors hardware included in its own SP board and monitors the active SP 200-1. If the active SP 200-1 goes down due to a failure of hardware, a failure of firmware, or the like, the standby SP 200-2 is switched to active and may continuously control and monitor the inside of the server 100.

The active SP 200-1 controls the power-on of the server 100 and the like. If the active SP 200-1 goes down during the power-on sequence or the like and the standby SP 200-2 is switched to active, the standby SP 200-2 takes over a continues the currently executed power-on sequence or the like. Thus, the active SP 200-1 and the standby SP 200-2 synchronize data related to the control through the LAN so as to able to handle a failure or the like even if the active SP 200-1 goes down at an arbitrary time.

As a related art, a technique is known in which a shared nonvolatile memory that is accessible from redundant active and standby control devices is provided and the active control device writes information at the time of an operation in the shared memory and thereby allowing turn-off of the power source of the standby control device.

Related techniques are disclosed in, for example, Japanese Laid-open Patent Publication No. 10-207855, Japanese Laid-open Patent Publication No. 2013-125493, Japanese National Publication of International Patent Application No. 2013-531822, Japanese Laid-open Patent Publication No. 2008-242701, and International Publication Pamphlet No. WO 2012/023200.

Since the standby SP 200-2 does not control the product body (SBs 300 and the like) of the server 100 and the like, it may be considered that the standby SP 200-2 is suspended in order to reduce power consumed by the entire product.

The suspension is to store (save) details of processes executed by the CPU 200a included in the SP 200 into the memory 200b and stop an operation of the CPU 200a (turn off the power source). During the time when the SP 200 is in a suspended state, the operation of the CPU 200a, an operation of a LAN controller 200c for controlling the LAN, and the like may be stopped and power to be consumed by the entire product may be reduced.

The standby SP 200-2, however, executes processes described in the following items (a) to (e), for example. When the standby SP 200-2 transitions to the suspended state, the processes are not executed. Therefore, if the active SP 200-1 fails, the system may be out of control and free from monitoring.

(a) Synchronization of Data

In case that the active SP 200-1 is stopped during the power-on sequence, the standby SP 200-2 synchronizes data related to the control with the active SP 200-1 through the LAN in order to take over a continuation of the process.

(b) Monitoring of Operation of Active SP 200-1 (Other SP 200)

The standby SP 200-2 monitors an operation of the active SP 200-1 through the LAN. If the operation of the active SP 200-1 is stopped, the standby SP 200-2 is switched to active and controls the product body (SBs 300 and the like).

(c) Monitoring of Operation of Standby SP 200-2 (Own SP 200)

The standby SP 200-2 uses a watchdog timer 200f included in the CPLD 200e or the like to monitor an operation of the standby SP 200-2. For example, the standby SP 200-2 periodically resets the watchdog timer 200f in response to a periodical interrupt from a real time clock (RTC) 200d. If the watchdog timer 200f is not reset and a count value of the watchdog timer 200f reaches a predetermined value (predetermined time), the watchdog timer 200f causes the standby SP 200-2 to be reactivated (for example, outputs, to the CPU 200a, a signal that instructs the CPU 200a to reactivate the standby SP 200-2). Thus, the standby SP 200-2 periodically resets the watchdog timer 200f in order to suppress the reactivation.

(d) Monitoring of Hardware of Standby SP 200-2 (Own SP 200)

The standby SP 200-2 periodically reads a power source (voltage), the temperature, and the like of the standby SP 200-2 and thereby monitors hardware within the standby SP 200-2.

(e) Waiting for Instruction of Switching from Active SP 200-1

It is preferable that when the active SP 200-1 detects an abnormality of hardware or an instruction from a user is received, the standby SP 200-2 be quickly switched from standby to active.

In the SPs 200 for controlling the product body (SBs 300 and the like) of the server 100, the multiple processes are executed by the standby SP 200-2. However, there is a problem that it is difficult for the standby SP 200-2 to be efficiently suspended while executing the processes.

SUMMARY

According to an aspect of the present invention, provided is a control system including a first control device, a second control device, and a transfer storage unit. The first control device and the second control device are made redundant and configured to execute processes on a target device in a predetermined execution order. The transfer storage unit is accessible from the first control device and the second control device. The first control device includes a first storage unit and a first processor. The first storage unit is configured to store therein information to be used for the execution of the processes. The first processor is configured to reflect state information in the first storage unit and the transfer storage unit. The state information indicates a state of a process to be executed among the processes. The first processor is configured to transmit, to the second control device, a start notification that causes the second control device to start an operation of the second control device. The second control device includes a second storage unit and a second processor. The second storage unit is configured to store therein information to be used for the execution of the processes. The second processor is configured to start the operation of the second control device in response to reception of the start notification from the first control device when the second control device is in a suspended state in which the operation of the second control device is stopped. The second processor is configured to read the state information from the transfer storage unit. The second processor is configured to reflect the read state information in the second storage unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram illustrating an example of a hardware configuration of an SP;

FIG. 3 is a diagram illustrating an example of a functional configuration of an SP;

FIG. 4 is a diagram illustrating an example of a data structure of sequence tables;

FIG. 5 is a diagram illustrating an example of a data structure of a sequence management queue;

FIG. 6 is a diagram illustrating an example of a data structure of a data transfer queue;

DESCRIPTION OF EMBODIMENT

Figure 1:
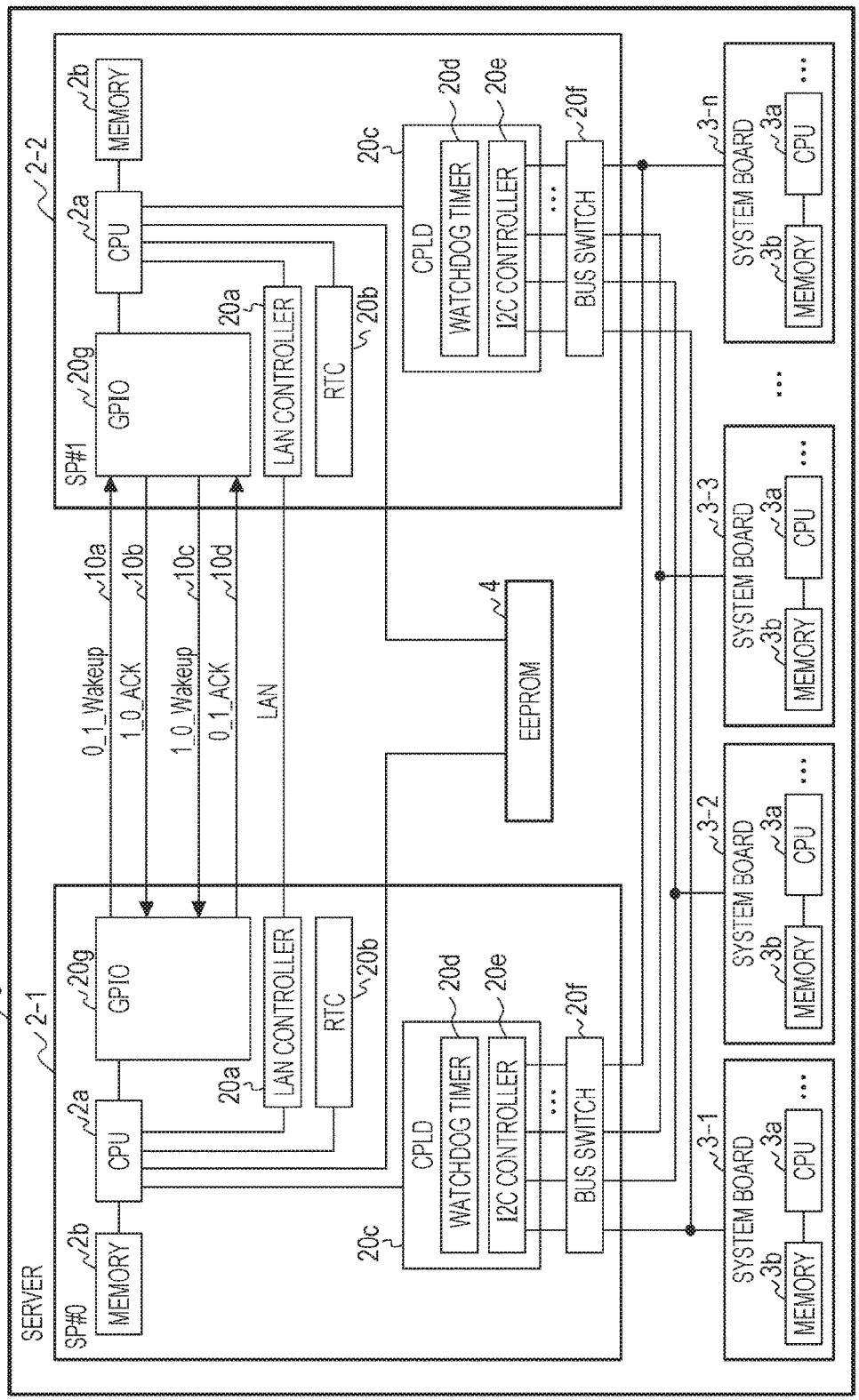
FIG. 1 is a diagram illustrating an example of a configuration of a server according to an embodiment.

Hereinafter, an embodiment is described with reference to the accompanying drawings. The embodiment described below, however, is an example and does not intend to exclude the application of various modifications and techniques that are not explicitly indicated below. The embodiment may be variously modified without departing from the gist of the embodiment. In the drawings, parts that are indicated by the same reference numeral indicate parts that are the same as or similar to each other, unless otherwise noted.

Embodiment

As exemplified in FIG. 1, a server 1 according to the embodiment may include multiple (two in the example illustrated in FIG. 1) SPs 2-1 and 2-2, one or more (a number n of system boards in the example illustrated in FIG. 1) SBs 3-1 to 3-n, and an electrically erasable programmable read-only memory (EEPROM) 4. In the following description, the SPs 2-1 and 2-2 may be merely referred to as SPs 2 unless otherwise distinguished, and the SBs 3-1 to 3-n may be merely referred to as SBs 3 unless otherwise distinguished.

The server 1 is an example of an information processing system and may provide various services to a user by the one or more SBs 3.

The SPs 2 may control and monitor the server 1. The SPs 2 are made redundant in order to maintain high availability. The following description assumes that an SP 2 that functions as an active SP is the SP 2-1 and that an SP 2 that functions as a standby SP is the SP 2-2. In the following description, the SP 2-1 is expressed by SP#0 of a #0 system in some cases, and the SP 2-2 is expressed by SP#1 of a #1 system in some cases.

The active SP 2-1 controls and monitors various hardware parts such as the SBs 3, for example. In the example illustrated in FIG. 1, the active SP 2-1 controls and monitors a product body including the number n of SBs 3-1 to 3-n, for example, an entire rack storing the server 1.

The control and monitoring of the product body including the SBs 3 may include a power-on sequence, a power-off sequence, and the like. A "sequence" is an execution unit of the control such as power-on and the like. In a single sequence, multiple processes (steps) such as initialization of a module to be controlled and setting of a value in a register are executed in a predetermined execution order.

The active SP 2-1 is an example of a first control device configured to execute multiple processes on the SBs 3 to be controlled, in a predetermined execution order.

The standby SP 2-2 may monitor hardware included in its own SP board and monitor the active SP 2-1, for example. If the active SP 2-1 goes down due to a failure of hardware of the active SP 2-1, a failure of firmware of the active SP 2-1, or the like, the standby SP 2-2 is switched to active and may continuously control and monitor the inside of the server 1.

The standby SP 2-2 is an example of a second control device configured to monitor the active SP 2-1 as the example of the first control device and take over, from the active SP 2-1, the execution of multiple processes on the SBs 3 in accordance with a predetermined switching requirement.

Each of the SBs 3 is an example of an information processing device and may include a memory 3b and a CPU 3a for executing an OS of the server 1, and the like. In the embodiment, each of the SBs 3 is an example of a device to be controlled by the SPs 2.

The EEPROM 4 is an example of a nonvolatile memory. The EEPROM 4 is connected to the active SP 2-1 and the standby SP 2-2 and is used as a queue for synchronization of data between the SPs 2.

The EEPROM 4 is an example of a transfer storage unit arranged between the SPs 2-1 and 2-2. To make the EEPROM 4 to be accessible from the multiple SPs 2, it is preferable that the EEPROM 4 include ports (dual port in the example illustrated in FIG. 1) for the number (two in the example illustrated in FIG. 1) of the SPs 2.

The SPs 2 of the server 1 are described below in detail.

First, an example of a hardware configuration of the SPs 2 illustrated in FIG. 1 is described with reference to FIGS. 1 and 2. FIG. 2 is a diagram illustrating an example of the hardware configuration of the SPs 2. As illustrated in FIG. 1, the SPs 2 may each include a CPU 2a, a memory 2b, a LAN controller 20a, an RTC 20b, a CPLD 20c, a bus switch 20f, and a general-purpose input/output (GPIO) 20g, for example. As illustrated in FIG. 2, the SPs 2 may each include a storage unit 2c, an interface unit 2d, and an input/output (I/O) unit 2e, for example.

Each of the CPUs 2a illustrated in FIGS. 1 and 2 is an example of an arithmetic device (processor) configured to execute control of various types and calculation of various types. The CPU 2a of each SP 2 may be communicably connected to blocks within the SP 2 by a bus. As the arithmetic devices, electronic devices or integrated circuits such as micro processing units (MPUs), application specific integrated circuits (ASICs), or field programmable gate arrays (FPGAs) may be used, instead of the CPUs 2a, for example.

Each of the memories 2b is an example of hardware for storing therein data of various types and programs. As the memories 2b, volatile memories such as random access memories (RAMs) may be used, for example.

The storage unit 2c illustrated in FIG. 2 is an example of hardware for storing therein data of various types and programs. As the storage unit 2c, a magnetic disk device such as a hard disk drive (HDD), a semiconductor drive device such as a solid state drive (SSD), or a nonvolatile memory such as a flash memory or read-only memory (ROM) are used, for example.

For example, the storage unit 2c may store therein a control program 20 that achieves all or a part of various functions of the SP 2. The CPUs 2a may achieve the functions of the SP 2 by loading the control program 20 stored in the storage unit 2c into the memory 2b and executing the control program 20.

The interface unit 2d is an example of a communication interface configured to control connections and communications of the own SP 2 with the other SP 2, the SBs 3, and the EEPROM 4. For example, the interface unit 2d may include the LAN controller 20a, the bus switch 20f, the GPIO 20g, and the like that are illustrated in FIG. 1 and described later. The control program 20 may be downloaded to the SP 2 through the interface unit 2d from a network that is not illustrated.

In addition, since the SP 2 may access the EEPROM 4, the interface unit 2d may include an interface to be used by the CPUs 2a to access the EEPROM 4.

In addition, the interface unit 2d may include a reader configured to read data and programs stored in a computer-readable recording medium 2f. The reader may include a connection terminal or a device that are able to be connected to the computer-readable recording medium 2f or in which the computer-readable recording medium 2f is able to be inserted. As the reader, an adapter conforming to universal serial bus (USB) or the like, a drive device configured to access a recording disk, a card reader configured to access a flash memory such as an SD card, or the like may be used. The control program 20 may be stored in the computer-readable recording medium 2f.

As the computer-readable recording medium 2f, a non-transitory recording medium such as a flexible disk, an optical disc such as a compact disc (CD), a digital versatile disc (DVD), or a Blu-ray disc, a flash memory such as an USB memory or an SD card may be used, for example. As the CD, a CD-ROM, a CD-R, a CD-RW, or the like may be used. As the DVD, a DVD-ROM, a DVD-RAM, a DVD-R, a DVD-RW, a DVD+R, a DVD+RW, or the like may be used.

The I/O unit 2e may include at least a part of input unit such as a mouse, a keyboard, and operational buttons and an output unit such as a display. For example, the input unit may be used for various operations such as registration of settings by an operator or the like, a change in the settings by the operator or the like, selection (switching) of a mode of a system, tasks such as input of data, and the like, while the output unit may be used for confirmation of the settings by the operator or the like, various notifications, and the like.

Each of the LAN controllers 20a illustrated in FIG. 1 is an example of a communication interface configured to control a LAN connection, communication, and the like of the own SP 2 with the other SP 2. Each of the LAN controllers 20a includes a radio antenna or an adapter in which a LAN cable is able to be inserted. Each of the LAN controllers 20a may be connected to the other SP 2 by the LAN cable or a wireless LAN.

Each of the RTCs 20b may manage time by a clock generator or the like. Each of the RTCs 20b according to the embodiment is set to generate interrupts on the CPUs 2a periodically or at set times.

Each of the CPLDs 20c is an example of an integrated circuit and may have functions as a watchdog timer 20d and an I2C controller 20e.

The watchdog timer 20d is an example of a timer configured to measure time. If a count value of the watchdog timer 20d reaches a predetermined value (predetermined time), the watchdog timer 20d may output, to the CPU 2a, a signal instructing the CPU 2a to reactivate the SP 2, and the CPU 2a may reactivate the SP 2. The count value of the watchdog timer 20d may be reset by the CPU 2a.

The I2C controller 20e may acquire, from I2C devices connected to the I2C controller 20e through an I2C bus, information to be used for monitoring. As the I2C devices, devices such as a power source, temperature sensor, and a fan of the own SP 2 and the SBs 3 may be used.

Each of the bus switches 20f is an example of a communication interface configured to control connections and communications of the SP 2 with the SBs 3. Each of the bus switches 20f may be connected to the SBs 3 by cables or buses for control and monitoring. Each of the bus switches 20f may permit connections of the active SP 2 to the SBs 3 and close routes (paths) from the standby SP 2 to the SBs 3, for example.

Each of the GPIOs 20g is an example of a communication interface configured to control connections and communications of the own SP 2 with the other SP 2. Each of the GPIOs 20g according to the embodiment may control processes of suspending and resuming the standby SP 2 in accordance with an instruction from the CPU 2a.

A GPIO 20g is connected to a GPIO 20g included in another SP 2 through four signal lines 10a to 10d (cables or buses), for example. As illustrated in FIG. 1, for example, the signal lines 10a and 10d are used for communication from the SP#0 to the SP#1, a wakeup signal (0_1_Wakeup) is output (set) to the signal line 10a, and an ACK signal (0_1_ACK) is output (set) to the signal line 10d. The signal lines 10c and 10b are used for communication from the SP#1 to the SP#0, a wakeup signal (1_0_Wakeup) is output (set) to the signal line 10c, and an ACK signal (1_0_ACK) is output (set) to the signal lines 10b, for example.

The wakeup signal that is output from the active SP 2 to the standby SP 2 indicates whether or not the standby SP 2 is permitted to be suspended. As an example, when the standby SP 2 is permitted to be suspended, the CPU 2a of the active SP 2 controls the GPIO 20g of the active SP 2 to set an output level of the wakeup signal (to be output from the active SP 2 to the standby SP 2 through the signal line 10a) to a low level. On the other hand, when the standby SP 2 in a suspended state is to be resumed (reactivated), the CPU 2a of the active SP 2 controls the GPIO 20g of the active SP 2 to set the output level of the wakeup signal to a high level, for example.

When the CPU 2a of the standby SP 2 recognizes a change in the wakeup signal from the GPIO 20g of the active SP 2 through the GPIO 20g of the standby SP 2, the CPU 2a of the standby SP 2 controls the GPIO 20g of the standby SP 2 to set an output level of the ACK signal (to be output from the standby SP 2 to the active SP 2 through the signal line 10b) to a low or high level on the basis of the wakeup signal.

The aforementioned hardware configuration of the SPs 2 is an example. Thus, a hardware part may be added to or removed from each of the SPs 2 (for example, an arbitrary block may be added to or removed from each of the SPs 2), a hardware part of each of the SPs 2 may be divided, arbitrary hardware parts of each of the SPs 2 may be combined or integrated, a bus may be added to or removed from the SPs 2, and the like.

Next, an example of a process by a control system that includes the SPs 2 and EEPROM 4 according to the embodiment is described.

Since the SPs 2 according to the embodiment include the GPIOs 20g, the active SP 2 may suspend and resume the standby SP 2.

For example, when the standby SP 2 transitions to a suspended state, the standby SP 2 may save (store) details of a process executed by the CPU 2a in the memory 2b, stop components such as the LAN controller 20a, and stop the CPU 2a.

When the standby SP 2 is resumed, the CPU 2a that starts operating due to an interrupt may read the details of the process from the memory 2b and activate the components such as the stopped LAN controller 20a.

Figure 28:
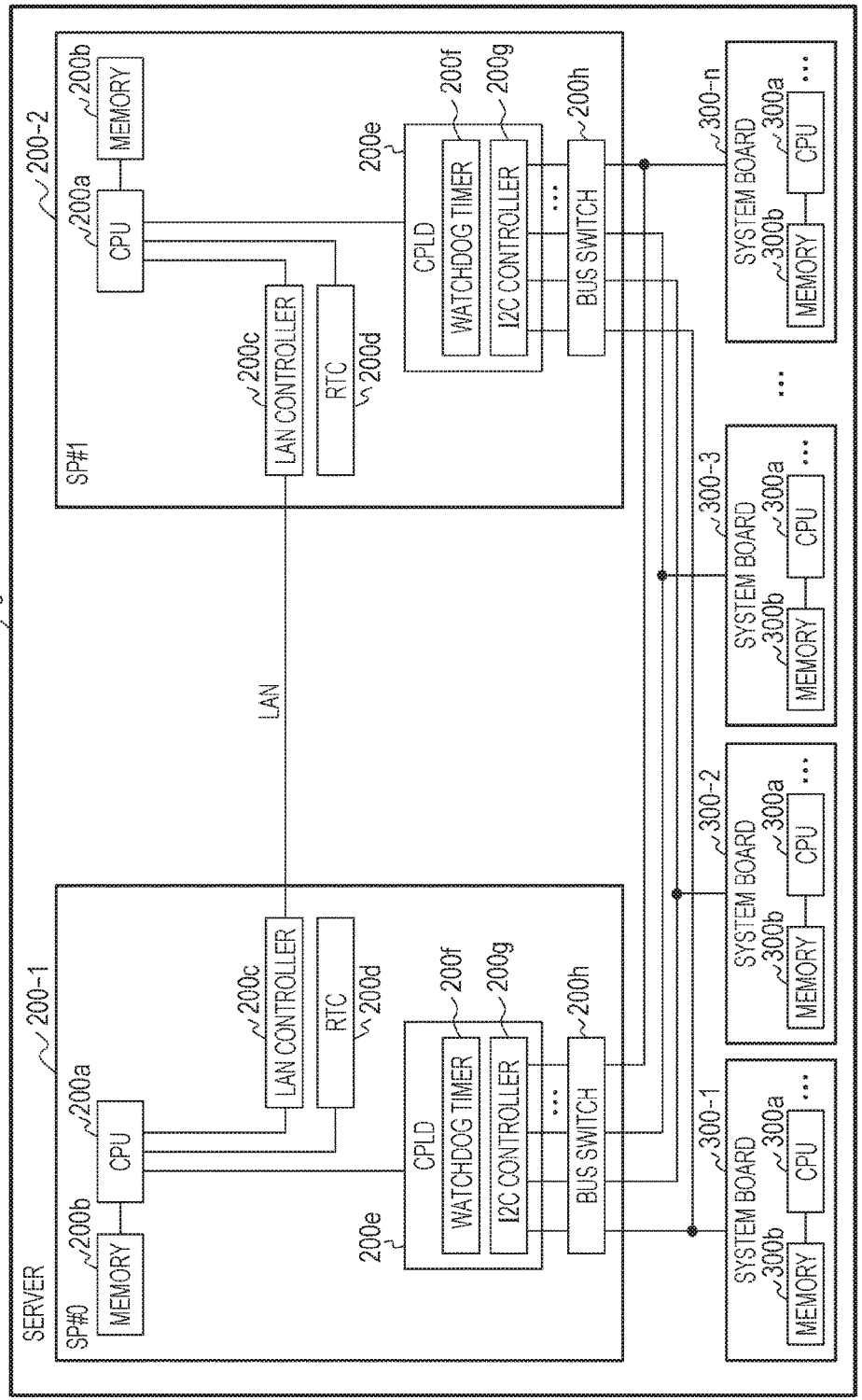
FIG. 28 is a diagram illustrating an example of a configuration of a server including multiple SPs.

As described above, however, the standby SP 200-2 illustrated in FIG. 28 executes the processes described in the aforementioned items (a) to (e). When the standby SP 200-2 transitions to a suspended state, these processes are not executed.

In the control system according to the embodiment, the standby SP 2 may be suspended and may be controlled to be resumed for processes described in the following items (A) to (E).

(A) Data synchronization (in a case where a data transfer queue 40 on the EEPROM 4 (refer to FIG. 3) is full)

(B) Monitoring of an operation of the active SP 2 (another SP 2)

(C) Monitoring of an operation of the standby SP 2 (own SP 2)

(D) Monitoring of hardware (a voltage, a temperature, and the like) of the standby SP 2 (own SP 2)

(E) switching between active and standby with the active SP 2 (another SP 2)

In order to execute the aforementioned processes, the standby SP 2 may be resumed in response to interrupts described in the following items (i) to (iii) during the suspended state, for example.

(i) An Interrupt Generated on the Basis of the Wakeup Signal (Input) of the GPIO 20g (the Cause of the Resumption is a Wakeup Instruction from the Active SP 2)

When the active SP 2 changes the output level of the wakeup signal (to be output to the standby SP 2 from the active SP 2) of the GPIO 20g, an interrupt is generated by the GPIO 20g of the standby SP 2 on the CPU 2a of the standby SP 2 in response to the change in the output level. The CPU 2a starts (restarts) operating in response to the interrupt and resumes the standby SP 2. At this time, the standby SP 2 may acquire data from the data transfer queue 40 on the EEPROM 4 to synchronize the data (refer to the aforementioned item (A)) after the resumption. A method for the data synchronization using the data transfer queue 40 is described later.

The standby SP 2 may achieve the process (switching process to be executed in accordance with a switch instruction from the active SP 2) described in the aforementioned item (E) by determining a predetermined switching requirement in response to a wakeup instruction from the active SP 2. In other words, the standby SP 2 may wait for the switch instruction from the active SP 2 while being in the suspended state.

(ii) An Interrupt by the RTC 20b (the Cause of the Resumption is a Periodical (Scheduled) Alarm)

The standby SP 2 may set, in the RTC 20b, intervals of monitoring of the hardware (a voltage, a temperature, and the like) of the own SP 2 or a time period to the next monitoring (or the time when the next monitoring is to be executed). Thus, an interrupt is generated by the RTC 20b on the CPU 2a of the standby SP 2 at the set intervals or set times. The CPU 2a starts (restarts) operating in response to the interrupt, resumes the standby SP 2, and monitors the hardware of the standby SP 2. At this time, the standby SP 2 may monitor an operation of the own SP 2 and an operation of the other SP 2. When completing the monitoring, the standby SP 2 may transition to the suspended state again.

In this manner, the standby SP 2 may execute the processes described in the aforementioned items (B) to (D) in response to the interrupt generated by the RTC 20b. Thus, it is preferable that the CPU 2a sets the intervals, the times, or the like of the monitoring of the hardware or the like in the RTC 20b and causes the RTC 20b to generate the interrupt in order for the standby SP 2 to transition to the suspended state. In this case, the intervals, the times, or the like that are set by the CPU 2a in the RTC 20b are preferably equal to or shorter than the minimum interval among intervals at which the operations of the own and other SPs 2 are monitored and intervals (shorter than a timeout period of the watchdog timer 20d) at which the hardware of the own SP 2 is monitored.

(iii) An Interrupt by the Watchdog Timer 20d (the Cause of the Resumption is a Timeout of the Watchdog Timer)

The CPU 2a of the standby SP 2 may monitor an operation of the own SP 2 in response to the interrupt generated by the RTC 20b and described in the aforementioned item (ii). In this case, the CPU 2a of the standby SP 2 may reset the watchdog timer 20d. However, if the watchdog timer 20d is not reset due to hang-up of the CPU 2a or the like, the watchdog timer 20d may time out. In this case, an interrupt (for example, an non-maskable interrupt (NMI)) is generated by the watchdog timer 20d on the CPU 2a, and the CPU 2a of the standby SP 2 is resumed in response to the interrupt and restarts the own SP 2.

The resumption of the standby SP 2 in response to the interrupt described in the aforementioned item (iii) indicates that the process, described in the aforementioned item (C), of monitoring the operation of the standby SP 2 failed (or an abnormality occurred in the own SP 2) due to hang-up of the CPU 2a or the like. In other words, when the standby SP 2 normally operates, the standby SP 2 in the suspended state is resumed in the cases where the interrupts described in the aforementioned items (i) and (ii) are generated.

Although the processes of the standby SP 2 are described above, the active SP 2 monitors and controls the SBs 3 and may monitor the hardware of the own SP 2 (active SP 2) (refer to the aforementioned item (D)). In this case, the active SP 2 sets, in the RTC 20b, intervals at which the monitoring is executed or times when the monitoring is executed in the same manner as the standby SP 2, and the active SP 2 executes the monitoring in response to the interrupt by the RTC 20b. In addition, the active SP 2 may monitor operations of the own SP 2 and the other SP 2 (refer to the aforementioned items (B) and (C)).

Next, an example of a functional configuration of the control system according to the embodiment is described with reference to FIG. 3. FIG. 3 illustrates an example of a functional configuration of the SPs 2 illustrated in FIG. 1. Both SPs 2-1 and 2-2 are able to function as either of active and standby SPs and may have the functions of both the active and standby SPs.

As illustrated in FIG. 3, each of the SPs 2 may include a monitoring processing section 21, a redundancy processing section 22, and a sequence processing section 23. These functions may be achieved by causing the CPUs 2a to execute the control program 20.

The monitoring processing section 21 may monitor hardware of the entire product including the server 1. The monitoring processing section 21 executes the monitoring when the own SP 2 is resumed in response to an interrupt by the RTC 20b, for example. For example, the monitoring processing section 21 may include an own-board monitoring section 21a and a server monitoring section 21b.

The own-board monitoring section 21a may monitor hardware within the own SP 2. For example, the own-board monitoring section 21a may execute the monitoring by acquiring information, such as information of a voltage, a temperature, and the like, to be used for the monitoring from a device connected to the I2C bus or connected to the CPU 2a, for example. The own-board monitoring section 21a may operate in a case where the SP 2 is the active SP 2 and in a case where the SP 2 is the standby SP 2.

If the own-board monitoring section 21a of the active SP 2 detects an abnormality of the hardware within the own SP 2 (active SP 2), the own-board monitoring section 21a of the active SP 2 may provide the standby SP 2, through the sequence processing section 23 of the active SP 2, with a notification to switch the SPs 2 between the active and standby SPs 2. When providing the notification and when the standby SP 2 completing a process of switching to active, the active SP 2 (own-board monitoring section 21a) may remove the own SP 2 (active SP 2) from the server 1 and shut down (or execute degeneration), for example. If the own-board monitoring section 21a of the standby SP 2 detects an abnormality of the hardware within the own SP 2 (standby SP 2), the own-board monitoring section 21a of the standby SP 2 may provide a notification to the other SP 2 (active SP 2) and shut down.

The server monitoring section 21b may use the I2C controller 20e to monitor the hardware of the entire product including the SBs 3, such as the power source (voltage) of the entire product including the SBs 3, the temperatures (temperature of absorbed air, temperatures of the CPUs 3a, and the like), the rotational speed of the fan, and the storage device (HDD or the like). The server monitoring section 21b may operate in a case where the SP 2 is the active SP 2.

When the server monitoring section 21b detects an abnormality (an abnormality of a voltage, an abnormality of a temperature, an abnormality of access to an HDD, or the like) of hardware within an SB 3, the server monitoring section 21b may remove the SB 3 from the server 1 and shut down the SB 3 (or execute degeneration).

The redundancy processing section 22 executes various processes related to the redundancy of the SPs 2 in the control system, such as transferring data between the active and standby SPs 2, monitoring an operation of the own SP 2 and an operation of other SP 2, and the like. For example, the redundancy processing section 22 may include an own-system monitoring section 22a, an other-system monitoring section 22b, and a data transferring section 22c.

The own-system monitoring section 22a may monitor an operation of the own SP 2. The own-system monitoring section 22a executes the monitoring by resetting the watchdog timer 20d and thereby suppressing the reactivation of the own SP 2, for example. It may be said that if the watchdog timer 20d is normally reset (or the reactivation is suppressed), the own-system monitoring section 22a confirms that the own SP 2 operates (or that the result of the monitoring is normal).

The other-system monitoring section 22b may monitor an operation of the other SP 2. For example, the CPU 2a of the own SP 2 transmits, to the CPU 2a of another SP 2, a notification to confirm an operation of the other SP 2 through the LAN and determines whether or not the CPU 2a of the own SP 2 has received a response within a predetermined time period, and thus the other-system monitoring section 22b may monitor the operation of the other SP 2. For example, if the CPU 2a of the own SP 2 receives the response within the predetermined time period, the CPU 2a may determine the confirmation that the other SP 2 operates (or that the result of the monitoring is normal). A heartbeat communication or the like may be executed for the monitoring of the operation.

The own-system monitoring section 22a and the other-system monitoring section 22b execute the monitoring when the own SP 2 is resumed in response to an interrupt by the RTCs 20b, for example. The own-system monitoring section 22a and the other-system monitoring section 22b may operate in a case where the own SP 2 is the standby SP 2. The own-system monitoring section 22a and the other-system monitoring section 22b, however, may also operate in a case where the own SP 2 is the active SP 2.

The data transferring section 22c may transfer data between the active SP 2 and the standby SP 2 through the LAN. For example, the data transferring section 22c may transfer data related to the control of the redundancy and to be synchronized and data related to a sequence currently executed by the sequence processing section 23. Thus, the active SP 2 and the standby SP 2 may be synchronized with each other, and even if an abnormality occurs in the active SP 2, the standby SP 2 may accurately take over a process executed by the active SP 2.

The data transferring section 22c may transfer data when a sequence process is executed (or the data is updated) by the sequence processing section 23 (described later) and the standby SP 2 is able to receive data (or is operating), for example.

The sequence processing section 23 may manage the execution of multiple control sequences such as a power-on sequence and a power-off sequence to the product body including the SBs 3. For example, the sequence processing section 23 may include sequence tables 23a, a sequence management queue 23b, an other-system data transferring section 23c, and a sequence managing section 23d.

The sequence tables 23a define multiple processes (steps) to be executed for each of the sequences (types) of power-on, power-off, and the like. In order to execute the power-on sequence or the like, the sequence processing section 23 may reference the sequence tables 23a and recognize a process to be executed and the order in which the process is to be executed. The sequence tables 23a are provided for the types of the sequences to be controlled.

FIG. 4 illustrates an example of a data structure of the sequence tables 23a. As illustrated in FIG. 4, each of the sequence tables 23a includes a header portion and multiple (for example, a number M+1, where M is a natural number) data portions #0 to #M, while the number of the data portions corresponds to the number of processes to be executed in the corresponding sequence.

In the header portion, for example, the number of sequence steps may be set, which indicates the number of the processes of the sequence to be executed.

In each of the data portions, a sequence step number, a function pointer for a sequence process execution function, a restart point after switching of the active SP 2, and a parameter may be set, for example.

The sequence step number is a unique number assigned to the respective steps of the sequence. Sequence step numbers set in each of the data portions are not required to be continuous to sequence step numbers set in other data portions.

The function pointer for a sequence process execution function is information that indicates the function pointer of a function (functional module) to be used to execute each step of the sequence process. The function indicated by the function pointer includes details of the process of the step, and the sequence processing section 23 may execute the process of the step by calling the function.

The restart point after switching of the active SP 2 is information that indicates the process of the step of the sequence that is interrupted and is to be restarted by an SP 2 that newly became the active SP 2. In the restart point, a sequence step number of the step to be restarted is stored.

In other words, the sequence tables 23a are an example of restart information that indicates restart points for multiple processes (steps) in case where the multiple processes (steps) are interrupted during the execution of the processes.

In order to restart an interrupted sequence, a recovery process is preferably executed instead of the re-execution of an interrupted step from the beginning of the step (or is executed again) in some cases, depending on the interrupted step. Thus, the step to be restarted in the case where the recovery process is to be executed may be set in the restart point. If the recovery process is not executed and a step that is the same as the interrupted step is to be executed again, "−1" may be set in the restart point, for example.

For example, during the execution of a control sequence such as the power-on sequence, the SP 2 may execute the sequence step again in order to continue to execute the process. On the other hand, if the active SP is switched to standby during the control of hardware, it may be difficult to continue to execute a process and thus the SP 2 may execute the recovery process such as the process of power-off. In the recovery process, the sequence is executed again from a point several steps previous to the interrupted step, or another step is executed before the interrupted step.

The parameter is information that indicates a parameter to be given to the sequence process execution function when the function is called.

In this manner, each of the sequence tables 23a may define processes of steps of a sequence and restart points upon switching. Thus, the sequence processing section 23 may acquire information indicating whether or not the recovery process is to be executed in a case where the switching is executed during each of the steps, and the sequence processing section 23 may acquire details of the recovery process.

The sequence management queue 23b is information to be used to manage data to be used for sequence processes executed by the sequence processing section 23 and is managed in a queue structure.

FIG. 5 illustrates an example of a data structure of the sequence management queue 23b. As illustrated in FIG. 5, the sequence management queue 23b includes a header portion and multiple (for example, a number N+1, where N is a natural number) data portions #0 to #N.

In the header portion, indices (indices for the data portions) for the head and tail entries of the queue may be set. The head entry index indicates an index for the top (HEAD) of the queue, while the tail entry index indicates an index for the end (TAIL) of the queue. The sequence processing section 23 may reference the head entry index and read an entry in order to process (execute) the queue and may reference the tail entry index and determine a storage destination in order to newly store an entry.

In each of the data portions, a sequence state, a sequence identifier (ID), a sequence type, a sequence step number, and information of hardware to be controlled may be set as an example of sequence data (state information) indicating the state of a sequence to be executed.

The sequence state is information indicating the state of the sequence. The sequence state may be any of the following states.

INVALID: The sequence is invalid (state before the execution of the sequence).
RUNNING: The sequence is being executed.
HOLD: The sequence is on hold (state in which the sequence processing section 23 waits for the completion of a process of a previous sequence).
SUSPENDED: The sequence is being suspended (state in which a sequence process executed by the active SP 2 is being suspended in order to execute the switching for the redundancy).
STOP: The sequence is being stopped (if a process of suspending the sequence is completed, the sequence transitions from the suspended state).
CANCELED: The sequence is canceled (if a previous process is canceled due to a subsequent process, for example, if the power-off sequence is registered in the sequence management queue 23b after the registration of the previous power-on sequence, the previous process of power-on is canceled).

The sequence ID is an example of information identifying the sequence process. The ID is assigned so that the ID does not match the ID of another sequence that is being executed.

The sequence type is information indicating the type of a process to be executed in the sequence process. The sequence type may be power-on, power-off, reset, or the like.

The sequence step number is information indicating the progress of the sequence process. In the sequence step number, a sequence step number of a sequence step lastly executed in the sequence is set. If the active SP 2 is switched to standby during the execution of the sequence, the active SP 2 after the switching may restart the sequence process from a restart point after the switching of the active SP 2, while the restart point is set in an entry of a sequence table indicated by the sequence step number.

The information of the hardware to be controlled indicates the hardware to be subjected to the sequence process set in the data portion. In the information of the hardware to be controlled, information that uniquely identifies an SB 3 to be controlled or the like is set, for example.

The aforementioned sequence tables 23a and the sequence management queue 23b may be stored and managed in at least a part of a storage region of each memory 2b. The memory 2b is an example of storage unit configured to store therein information to be used for the execution of multiple processes (steps) of each sequence.

As described above, the sequence management queue 23b that includes a sequence type and a sequence ID is an example of state information that indicates a state of a process to be executed among multiple processes (steps).

The other-system data transferring section 23c may transmit and receive information of the sequence management queue 23b between the own SP 2 and the other SP 2. For example, during the time when the standby SP 2 is resumed (or operates), the other-system data transferring section 23c of the active SP 2 may transfer information of the sequence management queue 23b to the standby SP 2 through the LAN. At this time, the other-system data transferring section 23c may output the queue registered in the sequence management queue 23b to the data transferring section 22c of the redundancy processing section 22 and cause the data transferring section 22c to transfer the queue to the standby SP 2.

When receiving the information of the sequence management queue 23b from the active SP 2, the other-system data transferring section 23c of the standby SP 2 may register the received information in the sequence management queue 23b. The other-system data transferring section 23c of the standby SP 2 may access the sequence management queue 23b through the sequence managing section 23d.

The sequence managing section 23d may manage a sequence. For example, the sequence managing section 23d of the active SP 2 may update the sequence management queue 23b in response to the execution of the sequence by the sequence processing section 23.

In the embodiment, the standby SP 2 is permitted to be suspended. However, when the standby SP 2 is in the suspended state, the LAN controller 20a of the standby SP 2 is also stopped. Thus, the other-system data transferring section 23c of the active SP 2 is unable to transfer the information of the sequence management queue 23b to the standby SP 2 through the LAN. In addition, the redundancy processing section 22 of the active SP 2 is unable to transfer, to the standby SP 2 through the LAN, data related to the redundancy and to be synchronized.

To avoid this, when the standby SP 2 is in the suspended state, the sequence managing section 23d according to the embodiment may transfer the data to the standby SP 2 through the data transfer queue 40.

The data transfer queue 40 is information to be used for the synchronization of the data between the SPs 2 when the standby SP 2 is in the suspended state. The data transfer queue 40 is stored in at least a part of a storage region of the EEPROM 4 and managed in a queue structure, for example. Data enqueued in the data transfer queue 40 is dequeued by the sequence processing section 23 (sequence managing section 23d) of the standby SP 2 upon the resumption of the standby SP 2 and reflected in the sequence management queue 23*b* of the standby SP 2, for example.

FIG. 6 illustrates an example of a data structure of the data transfer queue 40. As illustrated in FIG. 6, the data transfer queue 40 includes a header portion and multiple (for example, a number i+1, where i is a natural number) data portions #0 to #i.

In the header portion, indices (indices for the data portions) for the head and tail entries of the queue may be set.

In each of the data portions, the type of data to be transferred and the data to be transferred may be set as an example of information to be transferred from the active SP 2 to the standby SP 2.

The type of the data to be transferred is information indicating the type of the data to be transferred to the standby SP 2. The type of the data to be transferred may be any of the following types.

Sequence queue

Redundant synchronization data

The data to be transferred is data to be transferred to the standby SP 2. For example, when the type of the data to be transferred indicates a sequence queue, the sequence queue (at least one data portion of the sequence management queue 23*b*) to be transferred or differential data of an updated portion of the sequence queue may be set in the data to be transferred.

The differential data may include a sequence ID, an offset (offset from the top of the relevant data portion) of the updated portion of the sequence management queue 23*b*, and data after the update.

For example, when a sequence step number of a sequence queue of a sequence ID "3" is updated from "4" to "5" in the active SP 2 and stored at a position corresponding to the 12th byte from the top of the data portion, the differential data is as follows.

Sequence ID: 3

Offset: 12

Data: 5

When a sequence queue is removed from the sequence management queue 23*b* of the active SP 2 due to the completion of a sequence, data (differential data) that is to be transferred and indicates the removal of the sequence queue may be set. The data to be transferred may include a sequence ID of the removed sequence queue, an offset in which "−1" is set, and data in which "−1" is set, for example.

For example, when the type of the data to be transferred indicates redundant synchronization data, data (for example, a file) that is the same as or similar to the data to be transferred through the LAN may be set.

The sequence managing section 23*d* may cause data of the sequence management queue 23*b* to be stored in the data transfer queue 40 during the suspended state of the standby SP 2, as described above. In this case, the data transfer queue 40 may have no available region (or may be full). In this case, the sequence managing section 23*d* may cause the GPIO 20*g* to set the wakeup signal to the high level and thereby resume the standby SP 2.

The sequence managing section 23*d* of the standby SP 2 resumed by the wakeup signal reflects, in the sequence management queue 23*b* of the standby SP 2, all data queued in the data transfer queue 40 and completes the synchronization. When the synchronization is completed, the sequence managing section 23*d* of the standby SP 2 causes the GPIO 20*g* to set the ACK signal to the high level to return an ACK response to the active SP 2.

When the active SP 2 receives the ACK response, the sequence managing section 23*d* of the active SP 2 causes the GPIO 20*g* to set the wakeup signal to the low level in order to suspend the standby SP 2 again. Upon receiving the wakeup signal of the low level, the standby SP 2 causes the GPIO 20*g* to set the ACK signal to the low level and transitions to the suspended state.

In this manner, even if the data transfer queue 40 does not have an available region during the suspended state of the standby SP 2, the active SP 2 may resume the standby SP 2 only during the time when the standby SP 2 acquires data queued in the data transfer queue 40. Thus, the standby SP 2 may be efficiently suspended and power to be consumed may be reduced.

Next, an example of a method of synchronizing the sequence management queues 23*b* by the sequence processing sections 23 of the active and standby SPs 2 is described with reference to FIGS. 7 to 10. FIGS. 7 to 10 illustrate only the sequence management queues 23*b* within the SPs 2 in order to simplify the description.

Figure 7:
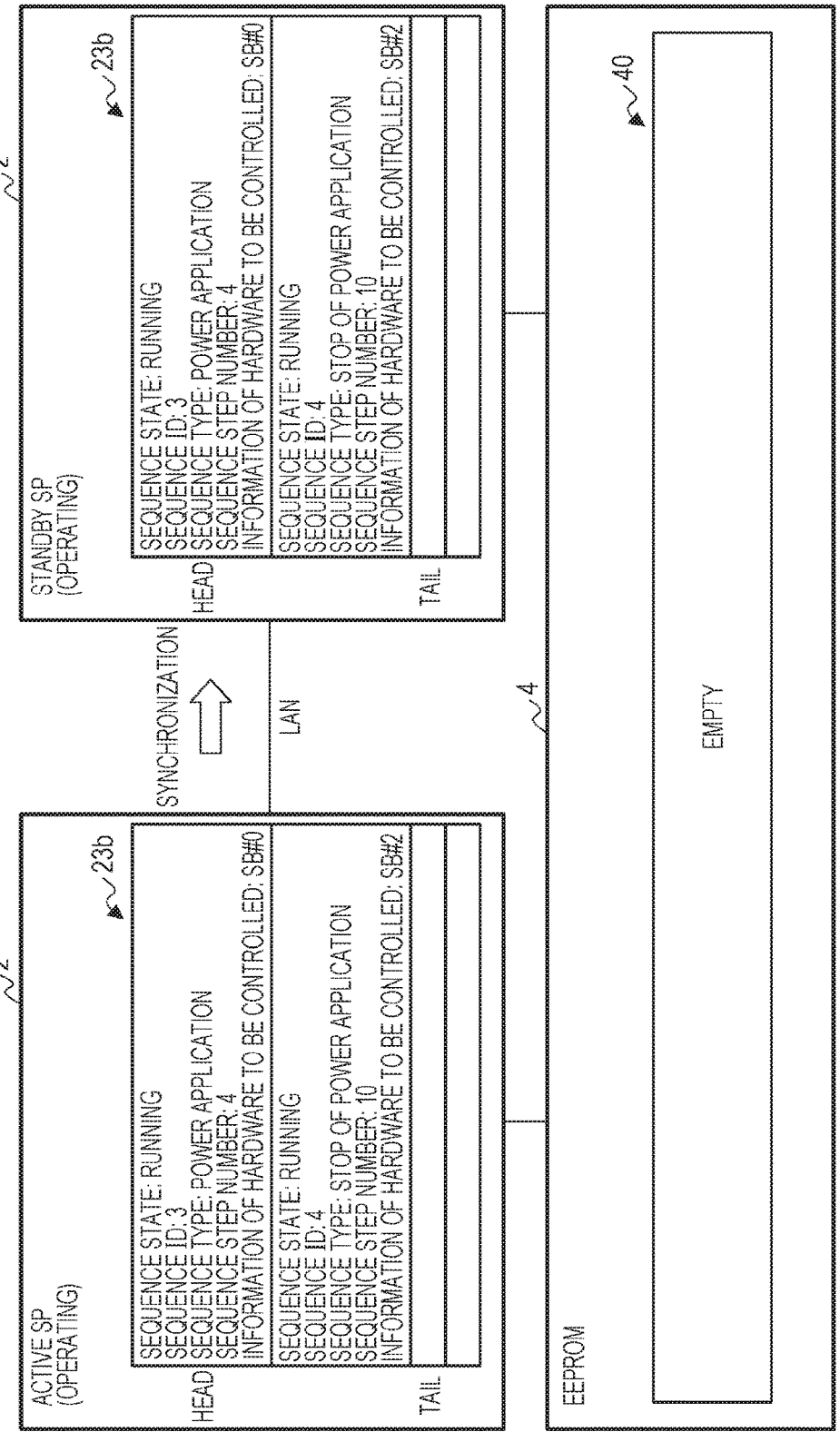
FIG. 7 is a diagram illustrating an example of a method of synchronizing sequence management queues by sequence processing sections.
Figure 8:
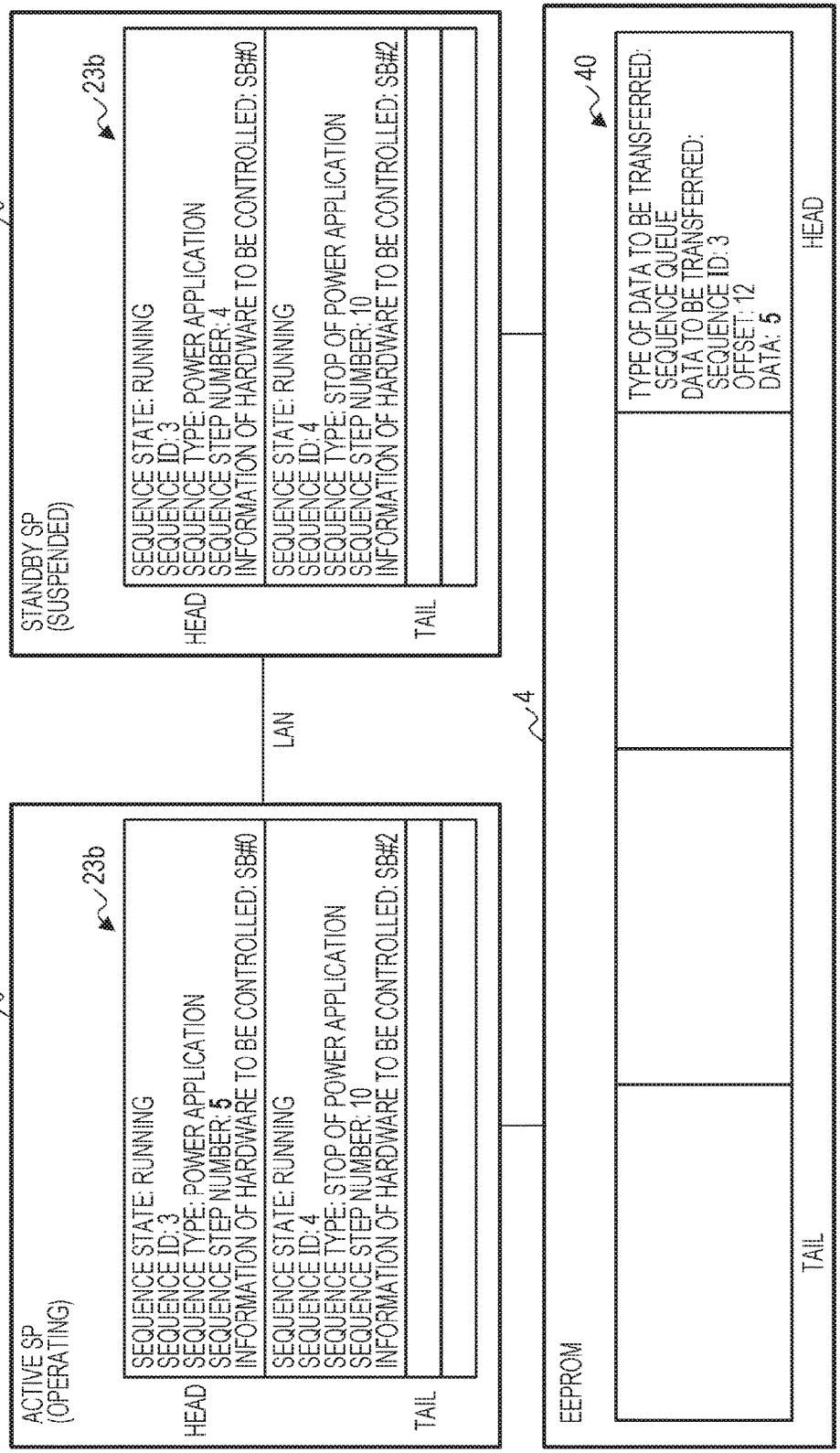
FIG. 8 is a diagram illustrating an example of a method of synchronizing sequence management queues by sequence processing sections.

As exemplified in FIG. 7, during the time when both the active and standby SPs 2 operate, the active SP 2 does not use the data transfer queue 40 and synchronizes the sequence management queues 23*b* with the standby SP 2 through the LAN.

When the standby SP 2 transitions to the suspended state, the active SP 2 is unable to synchronize the sequence management queues 23*b* with the standby SP 2 through the LAN. Thus, as exemplified in FIG. 8, the active SP 2 causes data queued in an updated region of the sequence management queue 23*b* to be stored in the data transfer queue 40. For example, if the sequence processing section 23 of the active SP 2 illustrated in FIG. 8 updates a sequence step number of the sequence ID "3" from "4" to "5", the active SP 2 stores the following data in an available entry (for example, HEAD) of the data transfer queue 40.

The type of data to be transferred: Sequence queue

Data to be transferred:

Sequence ID: 3

Offset: 12

Data: 5

Figure 9:
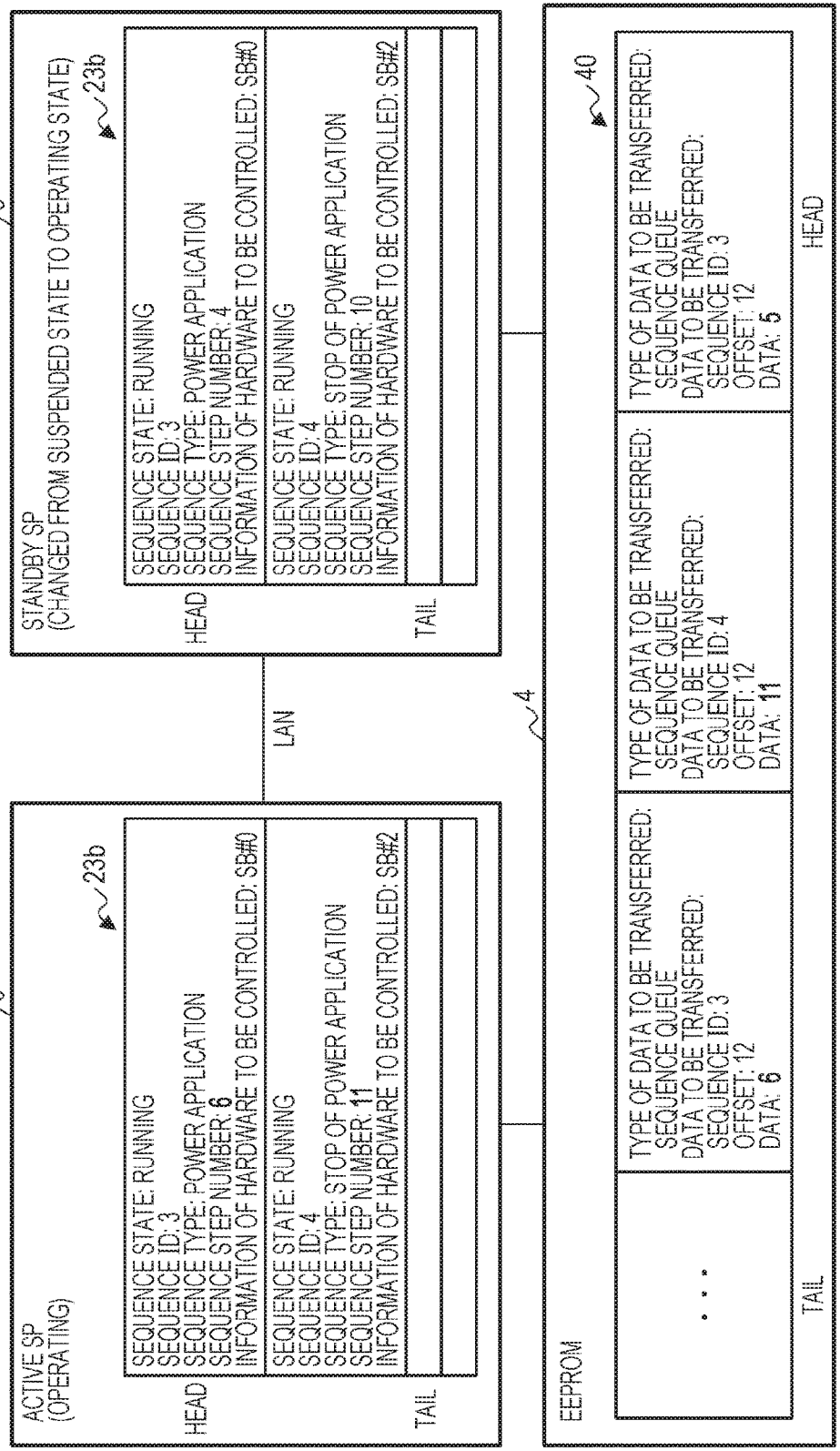
FIG. 9 is a diagram illustrating an example of a method of synchronizing sequence management queues by sequence processing sections.

Immediately after the standby SP 2 is resumed in response to the wakeup instruction or the like provided from the GPIO 20*g* of the active SP 2 to the standby SP 2, the sequence management queues 23*b* are not synchronized between the active SP 2 and the standby SP 2 suspended until just before the resumption, as exemplified in FIG. 9. For example, as illustrated in FIG. 9, the sequence step number of the sequence ID "3" in the standby SP 2 is "4", and the sequence step number of the sequence ID "3" in the active SP 2 is "6". In addition, the sequence step number of the sequence ID "4" in the standby SP 2 is "10", and the sequence step number of the sequence ID "4" in the active SP 2 is "11". The example illustrated in FIG. 9 indicates a case where the data transfer queue 40 has no available region and the active SP 2 outputs the wakeup signal (of the high level) to the standby SP 2.

Thus, after the standby SP 2 is resumed, the sequence processing section 23 (sequence managing section 23*d*) of the standby SP 2 reads data from the data transfer queue 40 in the order from HEAD and reflects the read data in the sequence management queue 23*b* of the standby SP 2.

Figure 10:
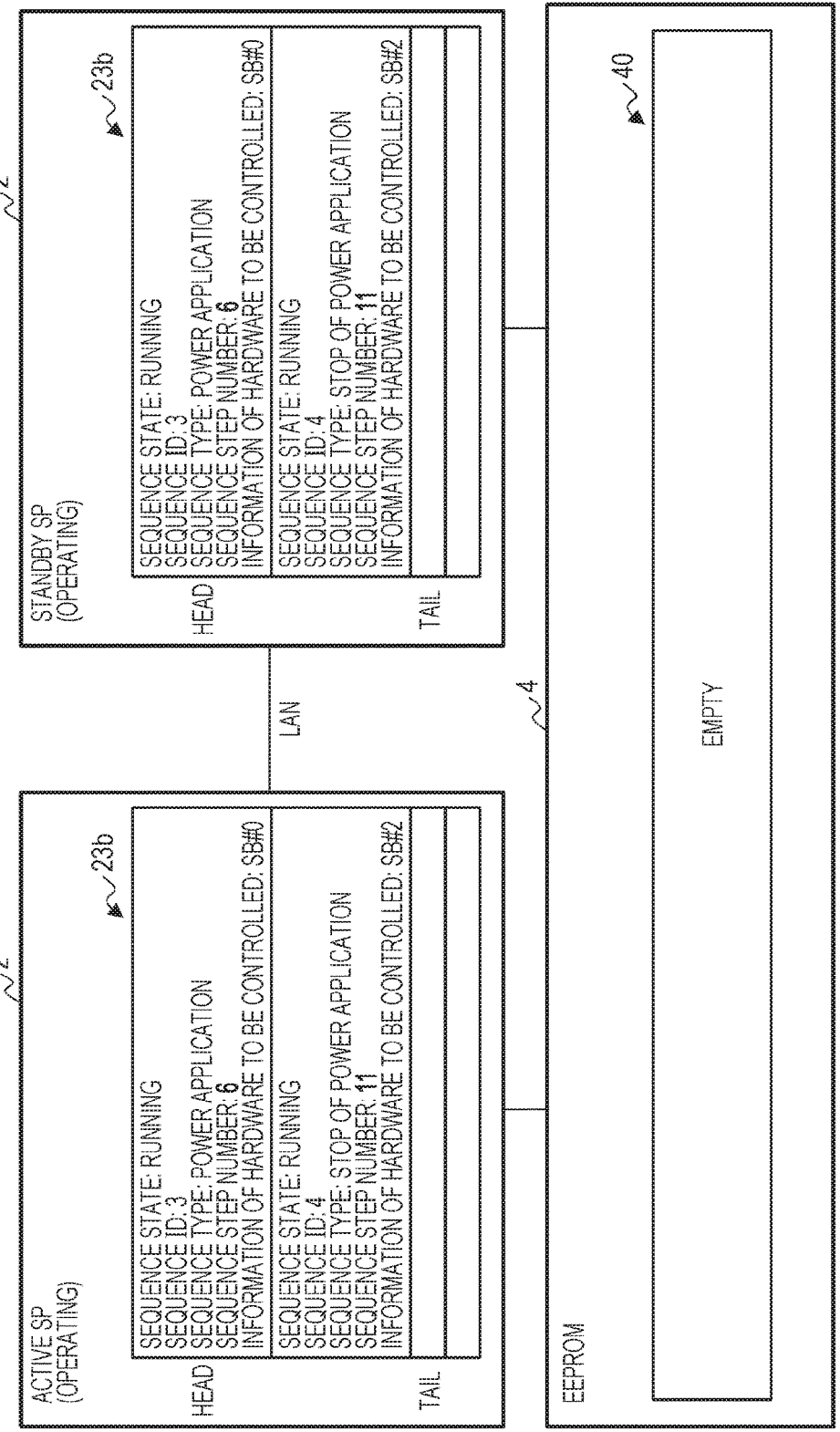
FIG. 10 is a diagram illustrating an example of a method of synchronizing sequence management queues by sequence processing sections.

When the standby SP 2 reflects all data queued in the data transfer queue 40 in the sequence management queue 23*b* of the standby SP 2 (in the order in which the data is stored), the synchronization of the sequence management queues 23*b* of the active and standby SPs 2 is completed, as exemplified in FIG. 10. In the example illustrated in FIG. 10, the sequence step number of the sequence ID "3" in the standby SP 2 is "6" which is the same as the sequence step number of the sequence ID "3" in the active SP 2, and the sequence step number of the sequence ID "4" is "11" in the standby SP 2 which is the same as the sequence step number of the sequence ID "4" in the active SP 2. After the completion of the synchronization, the standby SP 2 causes the GPIO 20g to transmit an ACK response (of the high level) to the active SP 2.

In the example illustrated in FIG. 9, two entries (sequence information of data "5" and sequence information of data "6") of the sequence ID "3" are queued in the data transfer queue 40. For example, when registering sequence information in the data transfer queue 40, the sequence managing section 23d may search the data transfer queue 40 for an entry on the basis of a sequence ID of the sequence information. If an entry having the same sequence ID exist, the sequence managing section 23d may reflect (write) the sequence information in (over) the entry. This may improve the efficiency of using the storage region of the data transfer queue 40.

Next, an example of the process of switching between the active and standby SPs when a failure occurs in the active SP 2 is described with reference to FIGS. 11 to 15, while attention is paid to the states of the sequence management queues 23b and the state of the data transfer queue 40. FIGS. 11 to 15 illustrate only the sequence management queues 23b within the SPs 2 in order to simplify the description.

Figure 11:
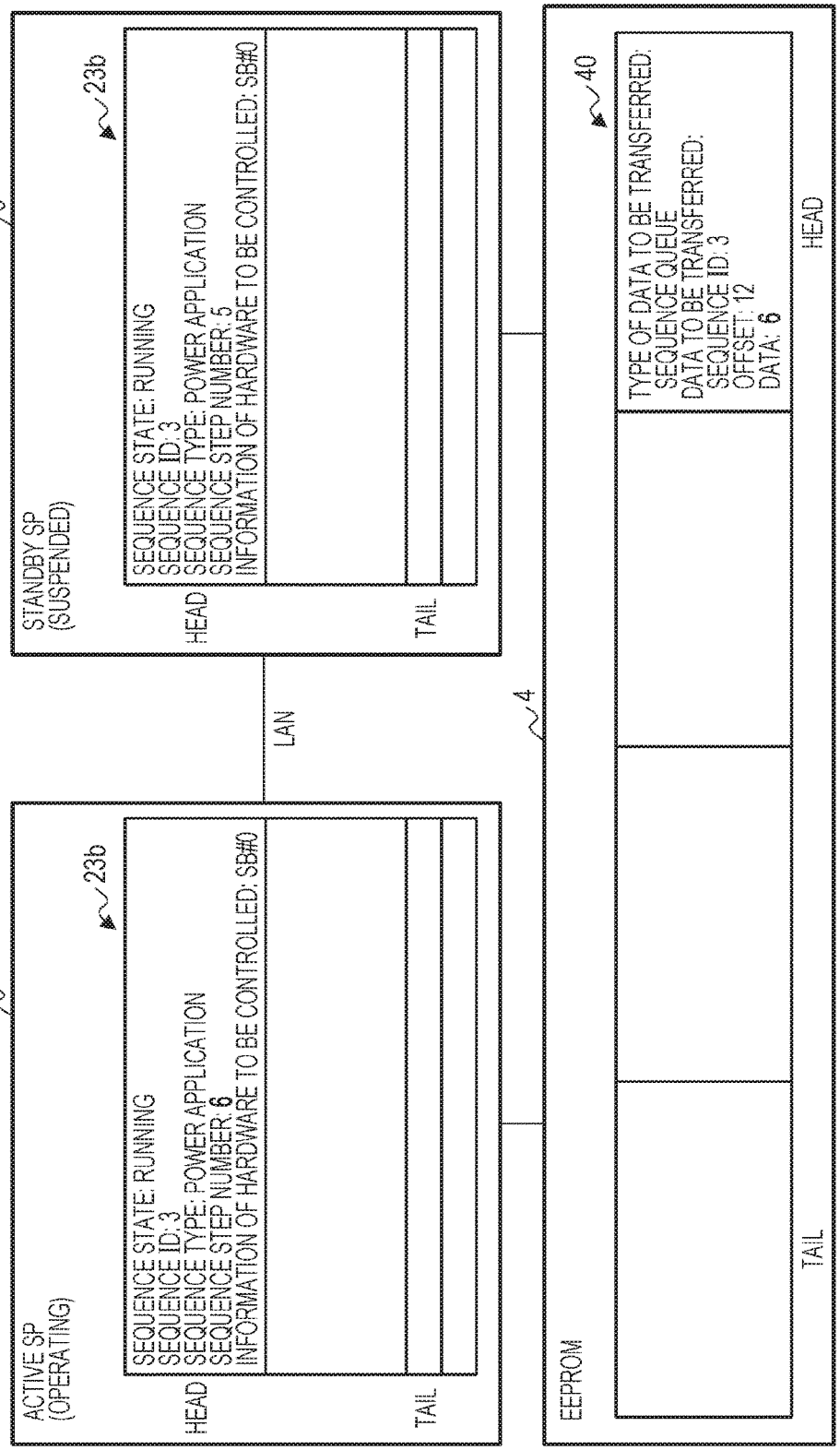
FIG. 11 is a diagram illustrating an example of a process of switching between active and standby SPs when a failure occurs in an active SP.

As exemplified in FIG. 11, a case where the own-board monitoring section 21a of the active SP 2 detects a failure of the own SP 2 during the suspended state of the standby SP 2 is described below. In this case, the own-board monitoring section 21a may notify the sequence processing section 23 of the failure of the own SP 2 (or the switching to standby).

Figure 12:
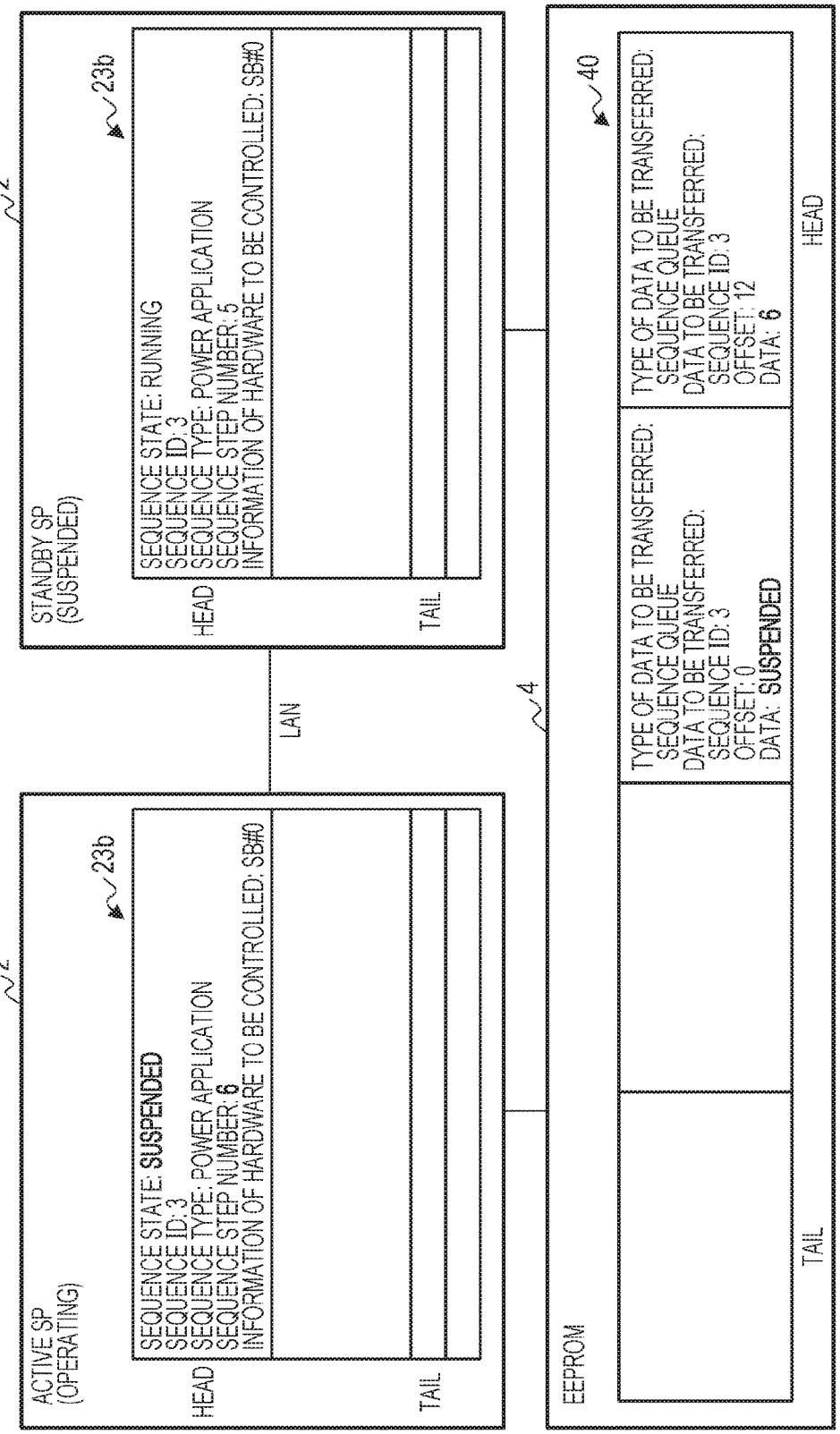
FIG. 12 is a diagram illustrating an example of a process of switching between active and standby SPs when a failure occurs in an active SP.
Figure 13:
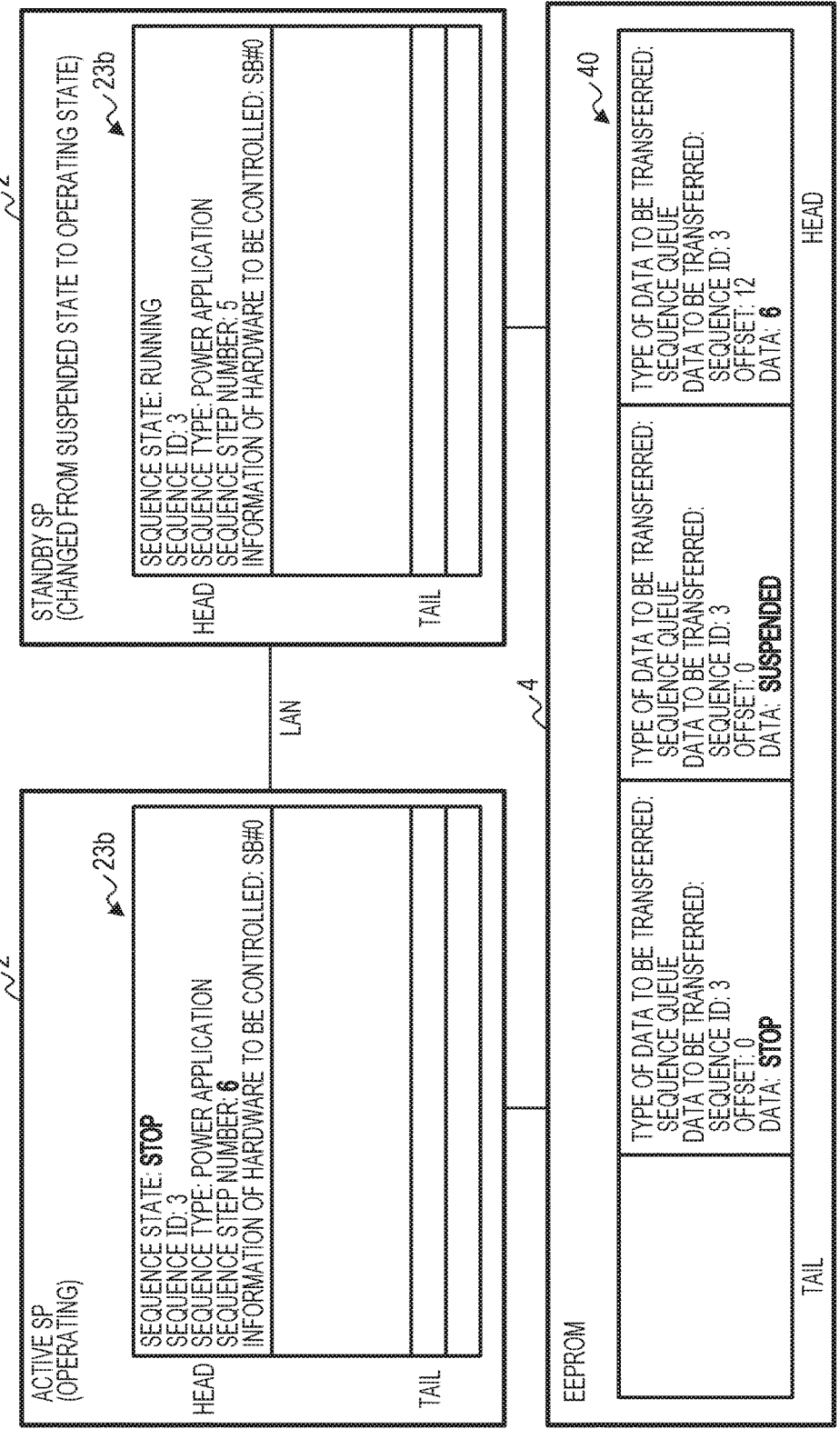
FIG. 13 is a diagram illustrating an example of a process of switching between active and standby SPs when a failure occurs in an active SP.

Upon receiving the notification indicating the failure from the own-board monitoring section 21a, the sequence processing section 23 (sequence managing section 23d) changes the state of a currently executed sequence indicated in the sequence management queue 23b to the suspended state in order to stop the currently executed sequence, as exemplified in FIG. 12. In addition, the sequence processing section 23 enqueues the detail of the change into the data transfer queue 40. For example, the sequence processing section 23 of the active SP 2 illustrated in FIG. 12 updates the state of the sequence with the sequence ID "3" from the running state to the suspended state in the sequence management queue 23b and stores the following data in an available entry of the data transfer queue 40.

Type of data to be transferred: Sequence queue
Data to be transferred:
Sequence ID: 3
Offset: 0
Data: Suspended As exemplified in FIG. 13, if the sequence processing section 23 of the active SP 2 suspended a sequence process such as the power-on sequence, the sequence processing section 23 of the active SP 2 changes the state of the sequence from the suspended state to the stopped state and reflects the detail of the change in the data transfer queue 40. At this time, the sequence processing section 23 provides the wakeup instruction to the standby SP 2 to resume the standby SP 2.

Figure 14:
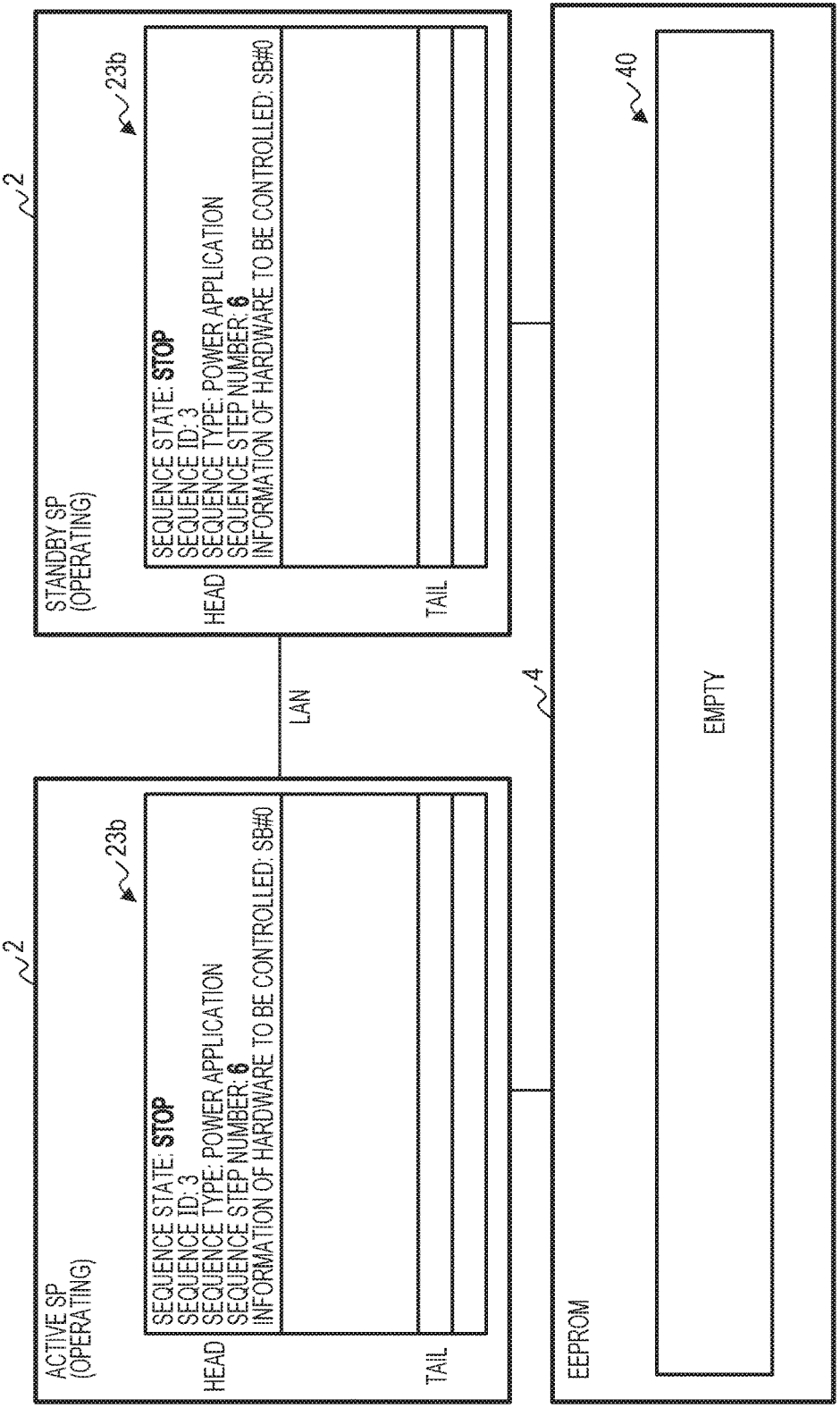
FIG. 14 is a diagram illustrating an example of a process of switching between active and standby SPs when a failure occurs in an active SP.

After the resumption of the standby SP 2, the sequence processing section 23 of the standby SP 2 reflects data within the data transfer queue 40 in the sequence management queue 23b of the standby SP 2, and the synchronization is completed, as exemplified in FIG. 14.

Figure 15:
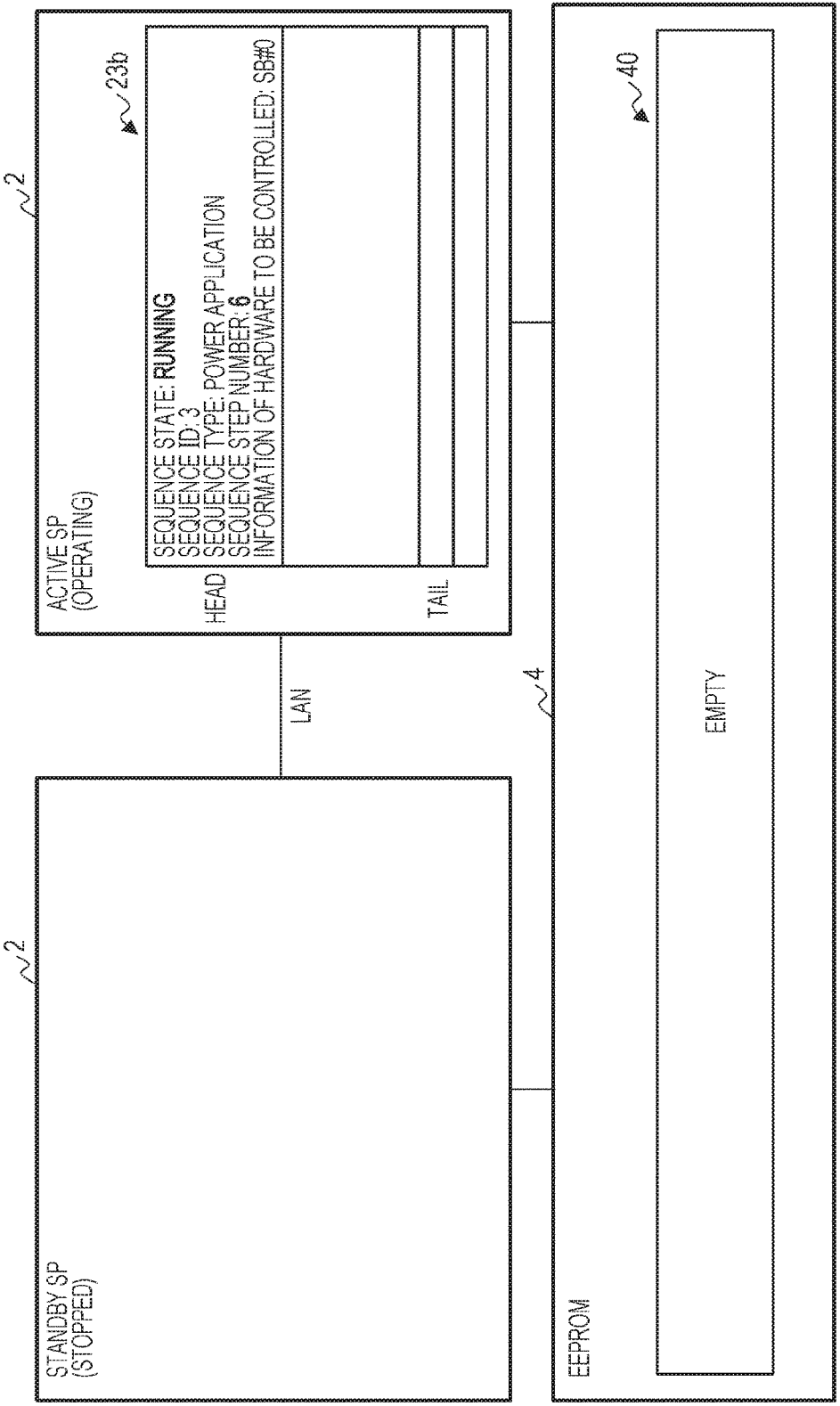
FIG. 15 is a diagram illustrating an example of a process of switching between active and standby SPs when a failure occurs in an active SP.

When the synchronization is completed, the active SP 2 and the standby SP 2 are switched and the sequence process is restarted by the active SP 2 after the switching, as exemplified in FIG. 15. In the switching of the active and standby SPs 2, the standby SP 2 (or the active SP 2 after the switching) may switch the bus switch 20f to an ON state and set the bus switch 20f to ensure that the standby SP 2 is able to access the SBs 3 and the like. The bus switch 20f is preferably set before the start of the sequence process (for example, before or after the completion of the synchronization).

The active SP 2 after the switching may reference a sequence step number of the sequence management queue 23b and thereby restart the sequence process from a restart point indicated in a sequence table corresponding to the sequence process.

When the aforementioned switching process is completed, the active SP 2 before the switching shuts down the OS and the like and becomes a stopped state (refer to FIG. 15).

Next, an example of operations of the control system that includes the SPs 2 and the EEPROM 4 that are configured as described above is described with reference to FIGS. 16 to 27.

First, an example of operations in the registration, update, and completion of a sequence by the control system and operations in the synchronization process by the control system are described with reference to FIGS. 16 to 22.

Figure 16:
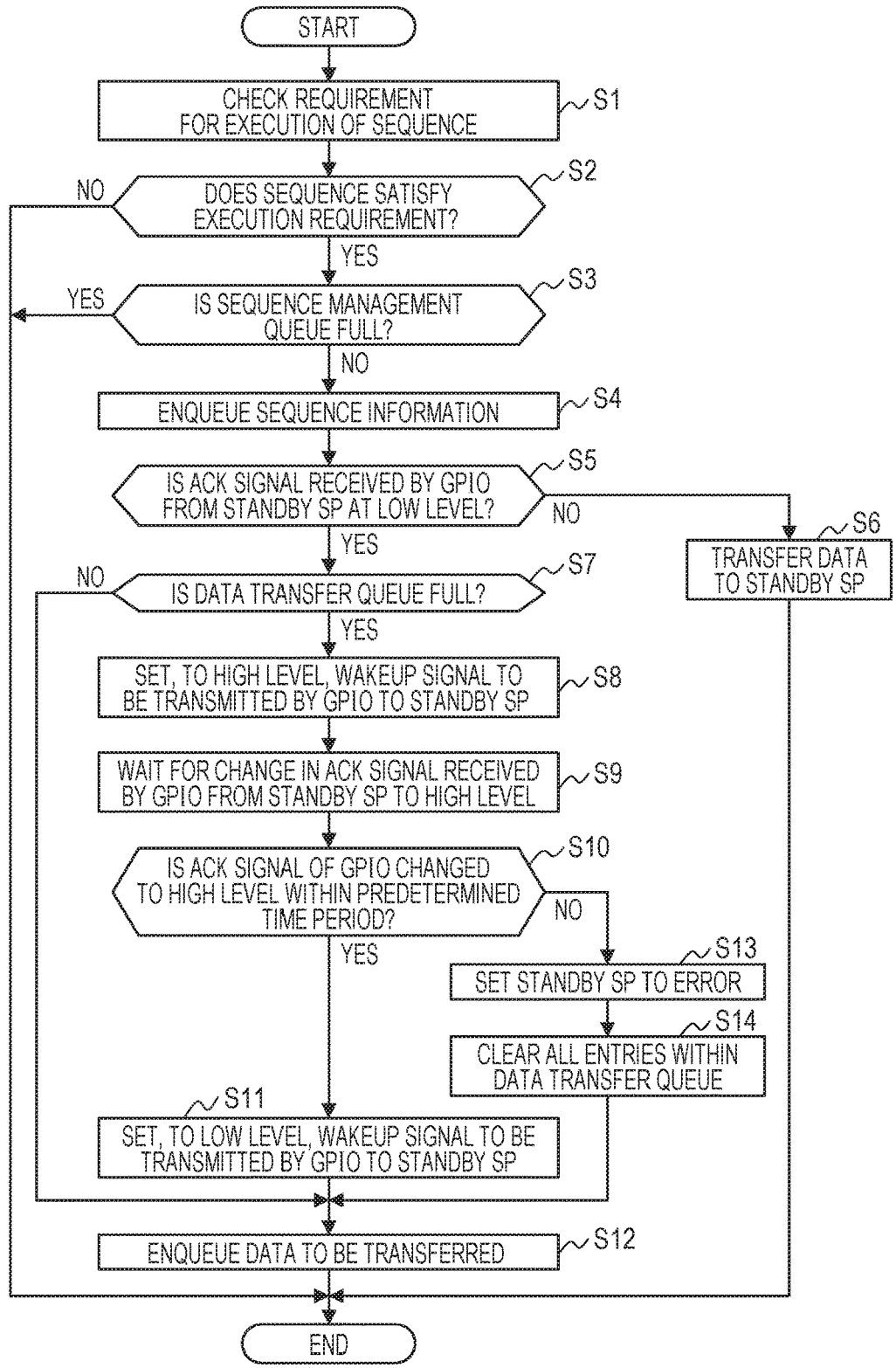
FIG. 16 is a flowchart of an example of operations in a sequence registration process by a sequence processing section of an active SP.
Figure 17:
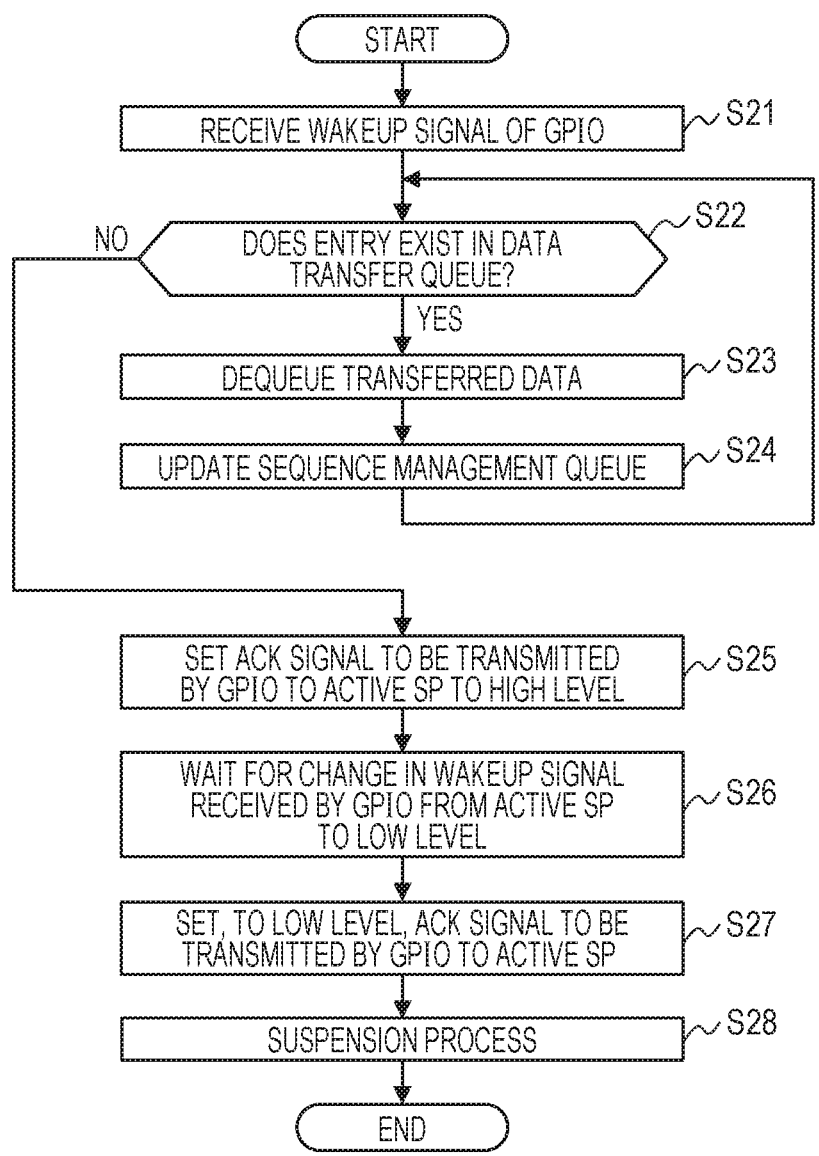
FIG. 17 is a flowchart of an example of operations in a data synchronization process by a sequence processing section of a standby SP.
Figure 18:
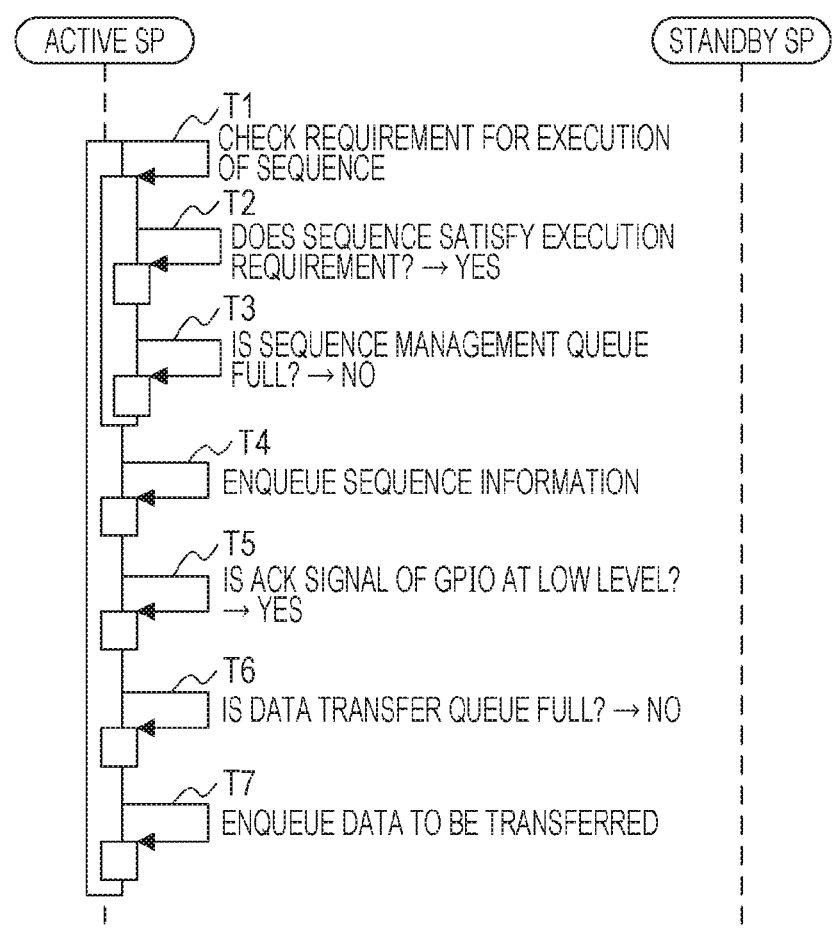
FIG. 18 is a sequence diagram illustrating an example of operations of active and standby SPs in sequence registration.
Figure 19:
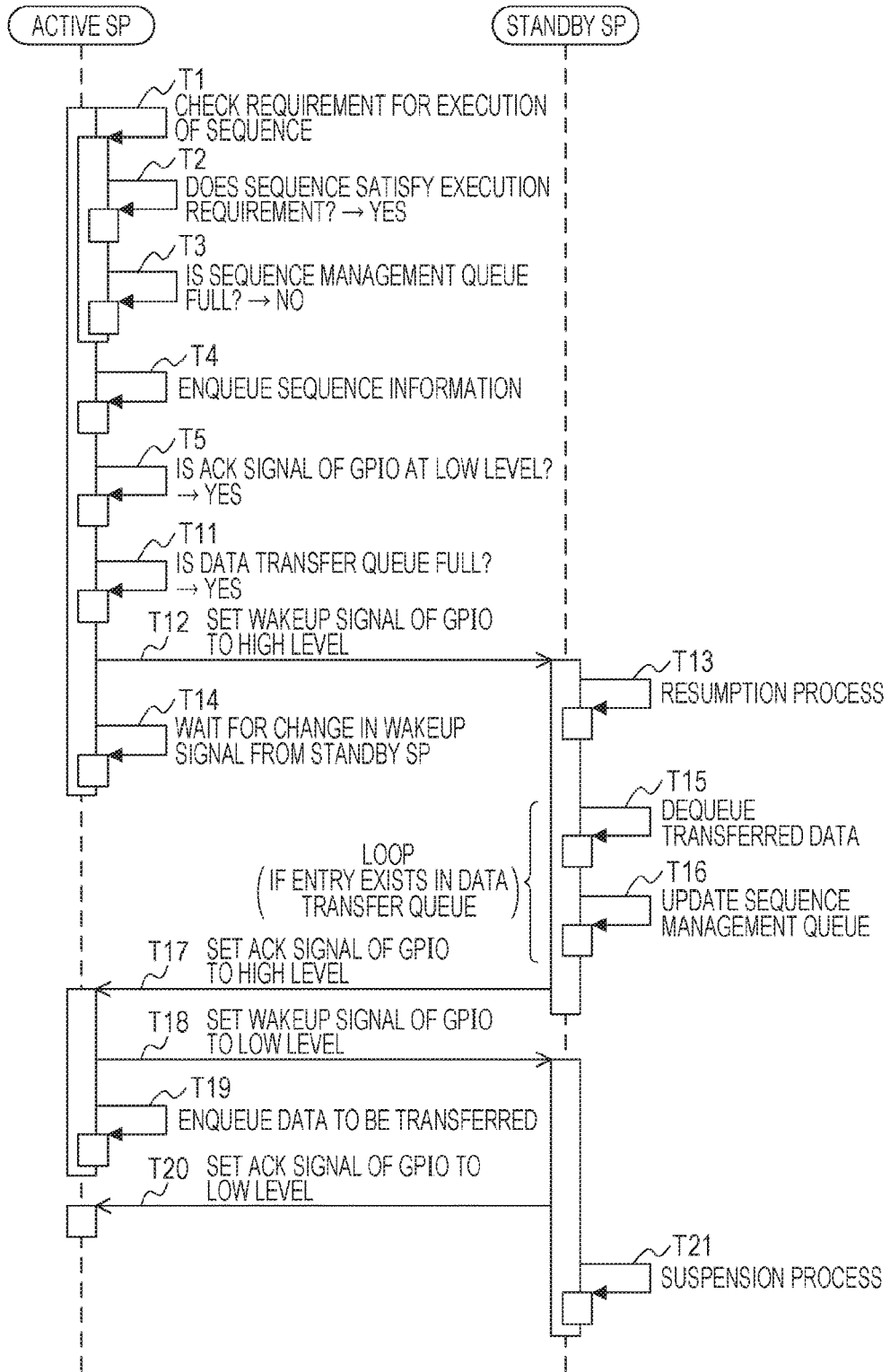
FIG. 19 is a sequence diagram illustrating an example of operations of active and standby SPs in sequence registration.
Figure 20:
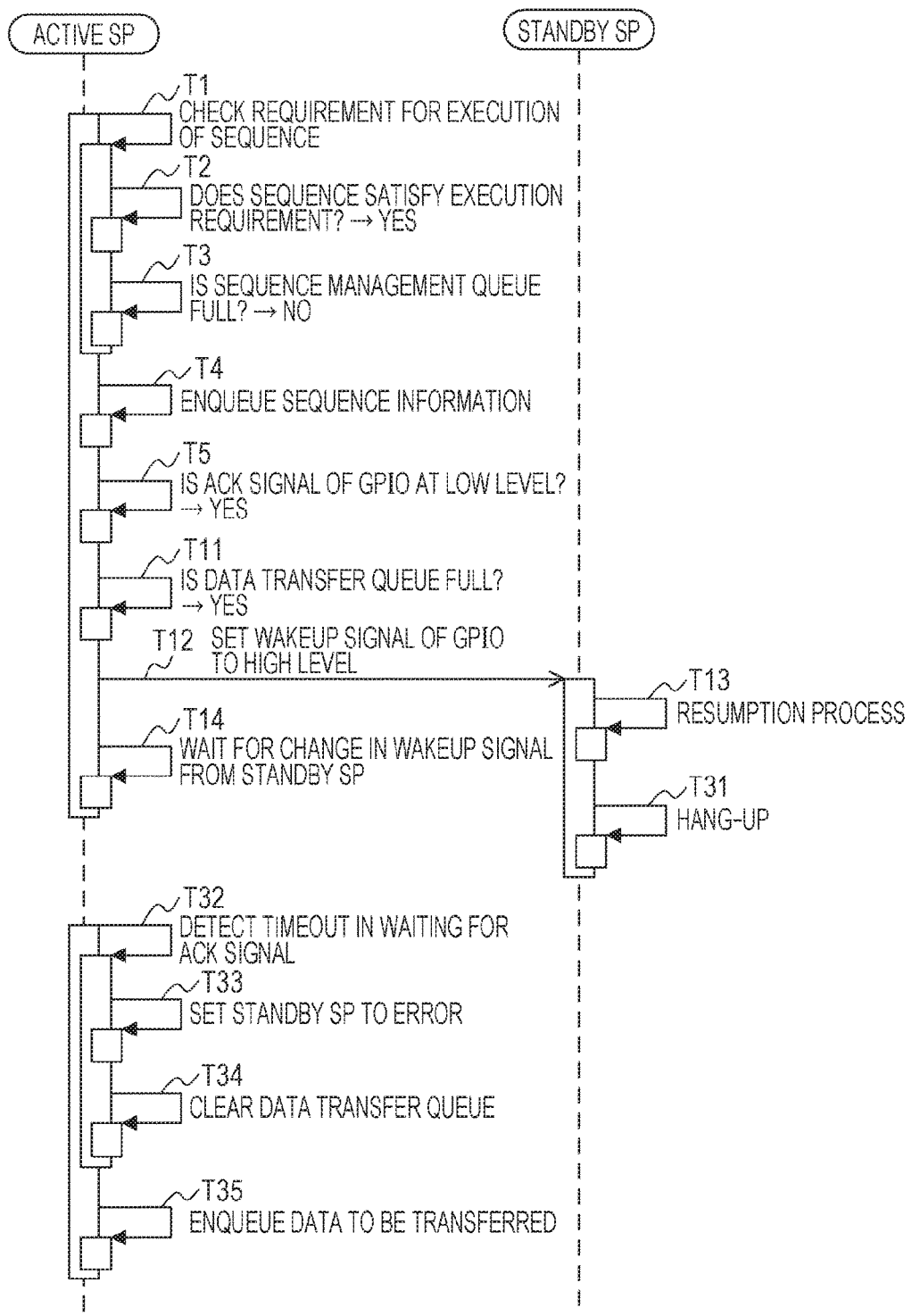
FIG. 20 is a sequence diagram illustrating an example of operations of active and standby SPs in sequence registration.
Figure 21:
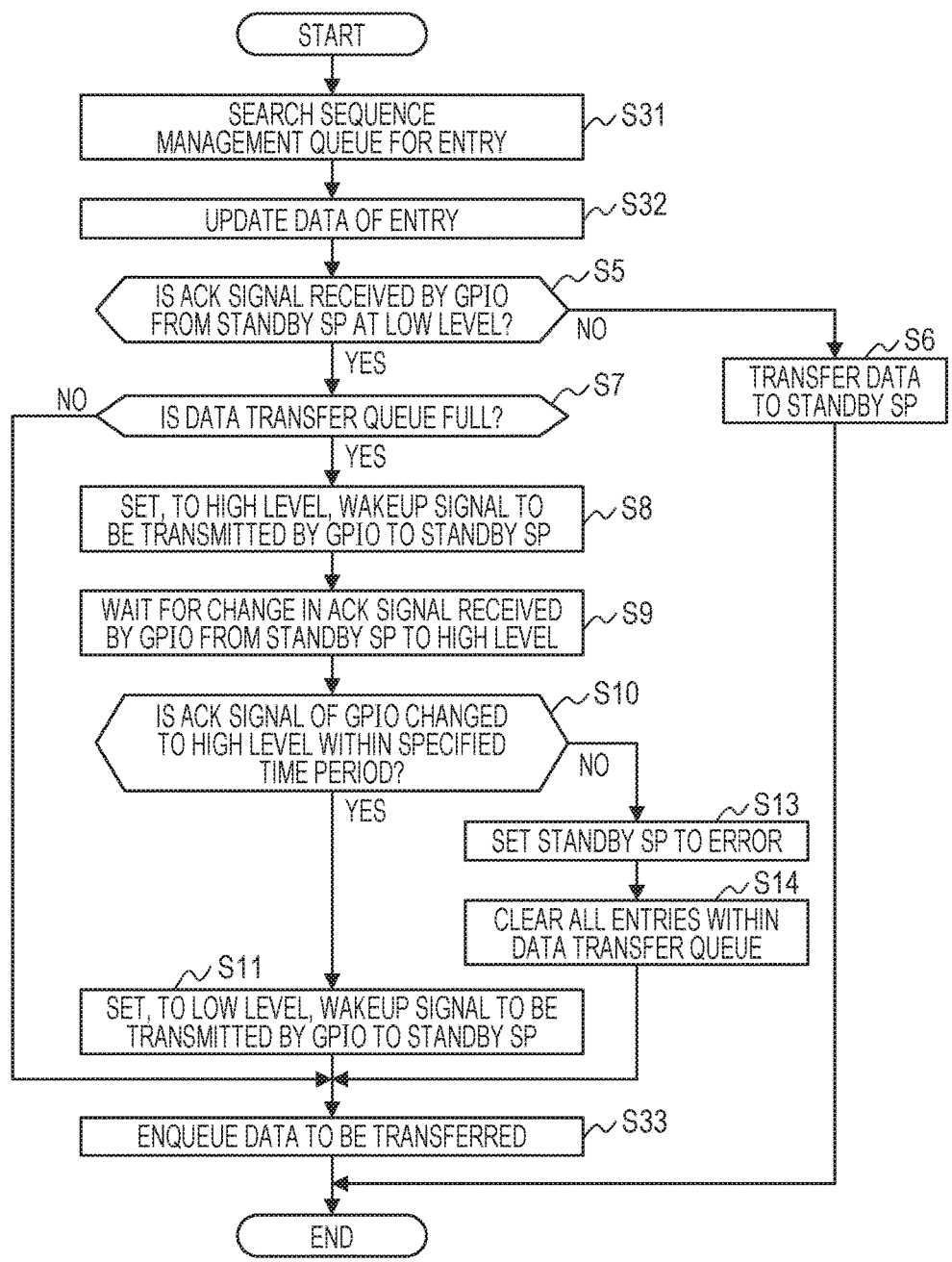
FIG. 21 is a flowchart of an example of operations in a sequence update process by a sequence processing section of an active SP.
Figure 22:
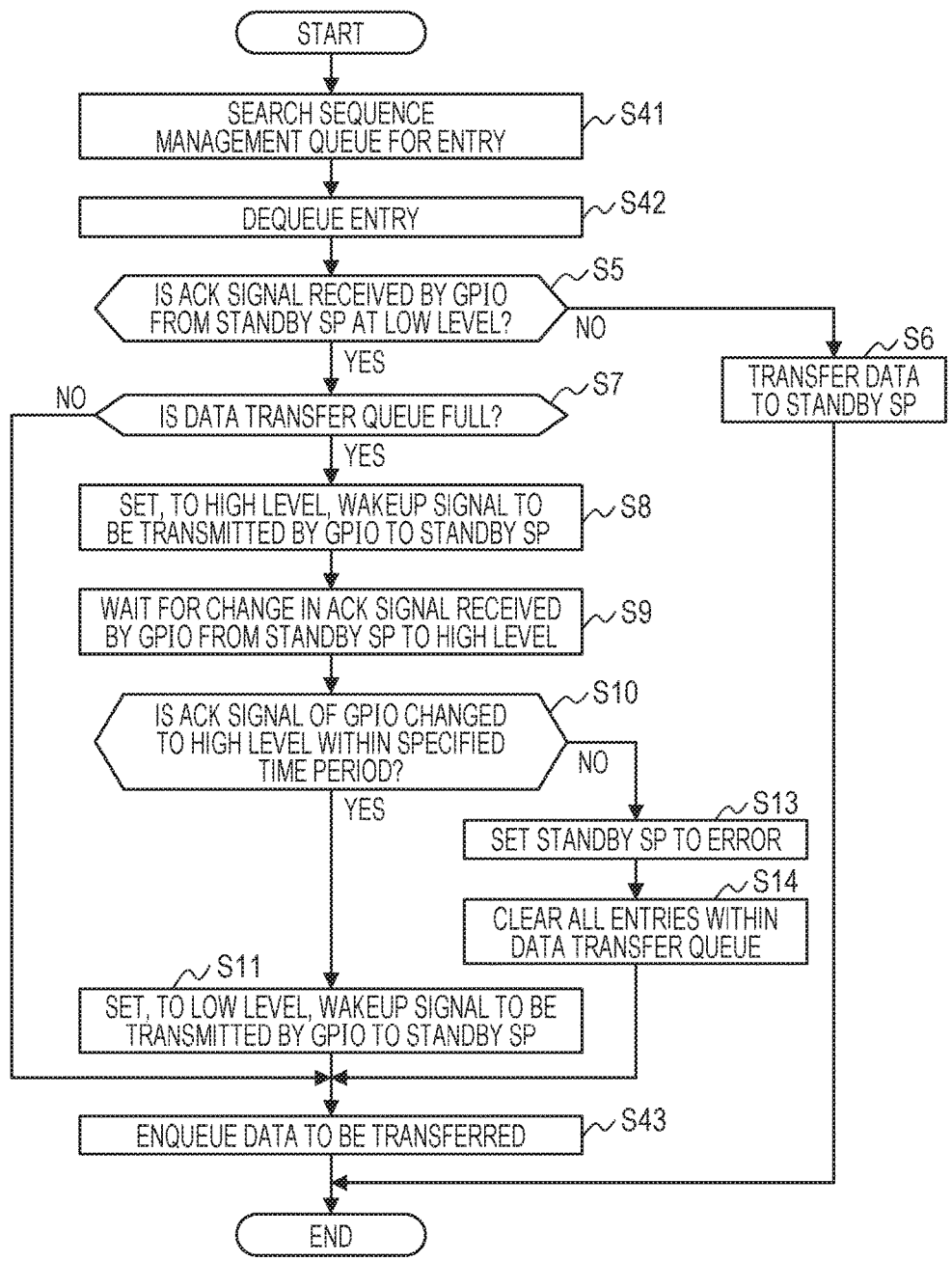
FIG. 22 is a flowchart of an example of operations in a sequence completion process by a sequence processing section of an active SP.

FIG. 16 is a flowchart of an example of operations in a sequence registration process by the sequence processing section 23 of the active SP 2. FIG. 17 is a flowchart of an example of operations in the data synchronization process by the sequence processing section 23 of the standby SP 2. FIG. 21 is a flowchart of an example of operations in a sequence update process by the sequence processing section 23 of the active SP 2, and FIG. 22 is a flowchart of an example of operations in a sequence completion process by the sequence processing section 23 of the active SP 2. FIGS. 18 to 20 are sequence diagrams illustrating examples of operations in sequence registration by the active and standby SPs 2.

As illustrated in FIG. 16, the sequence managing section 23d checks a requirement for execution of a sequence on the SBs 3 and the like (in S1; T1 illustrated in FIG. 18) and determines whether or not the sequence satisfies the execution requirement (in S2). For example, the execution requirement is that a subsequent sequence (for example, the power-off sequence after the power-on sequence) that makes the sequence to be executed invalid (or cancels the sequence to be executed) does not exist.

If the sequence does not satisfies the execution requirement (No in S2), the process of the active SP 2 is terminated. If the sequence satisfies the execution requirement (Yes in S2; T2 illustrated in FIG. 18), the sequence managing section 23d determines whether or not the sequence management queue 23b is full (in S3).

If the sequence management queue 23b is full (Yes in S3), any more sequence is unable to be registered and the process is terminated. If the sequence management queue 23b is not full (No in S3; T3 illustrated in FIG. 18), the sequence managing section 23d enqueues sequence information into the sequence management queue 23b (in S4; T4 illustrated in FIG. 18) and the process proceeds to S5.

In S5, the sequence managing section 23d determines whether or not the ACK signal received by the GPIO 20g from the standby SP 2 is at the low level. If the ACK signal is not at the low level (or is at the high level) (No in S5), the standby SP 2 may operate (or may be resumed) and the data transferring section 22c transfers data to the standby SP 2 through the LAN (in S6) and the process of the active SP 2 is terminated.

If the ACK signal is at the low level (Yes in S5; T5 illustrated in FIG. 18), the standby SP 2 may be suspended. The sequence managing section 23d determines whether or not the data transfer queue 40 is full in order to store, in the data transfer queue 40, the data to be synchronized with the standby SP 2 (in S7).

If the data transfer queue 40 is not full (No in S7; T6 illustrated in FIG. 18), the sequence managing section 23d enqueues the data into the data transfer queue 40 (in S12; T7 illustrated in FIG. 18) and the process of the active SP 2 is terminated.

If the data transfer queue 40 is full (Yes in S7; T11 illustrated in FIG. 19), any more data is unable to be stored in the data transfer queue 40. Thus, the sequence managing section 23d sets, to the high level, the wakeup signal to be transmitted by the GPIO 20g to the standby SP 2 in order to cause the standby SP 2 to resume and acquire the data from the data transfer queue 40 (in S8; T12 illustrated in FIG. 19).

At this time, the standby SP 2 receives the wakeup signal (of the high level) from the GPIO 20g of the active SP 2 (in S21), as illustrated in FIG. 17, and executes the resumption process (in T13 illustrated in FIG. 19). Then, the sequence managing section 23d of the standby SP 2 determines whether or not an entry exists in the data transfer queue 40 (in S22).

If the entry exists in the data transfer queue 40 (Yes in S22), the sequence managing section 23d dequeues the data from the data transfer queue 40 (in S23; T15 illustrated in FIG. 19). Then, the sequence managing section 23d reflects the dequeued data in the sequence management queue 23b (in S24; T16 illustrated in FIG. 19) and the process proceeds to S22 (if the entry exists in the data transfer queue 40, T15 and T16 illustrated in FIG. 19 are looped).

If no entry exists in the data transfer queue 40 (No in S22), the sequence managing section 23d sets, to the high level, the ACK signal to be transmitted by the GPIO 20g to the active SP 2 (in S25; T17 illustrated in FIG. 19) and notifies the active SP 2 of the completion of the process.

Returning to FIG. 16, the active SP 2 waits for a change in the ACK signal received by the GPIO 20g from the standby SP 2 to the high level (in S9 and S10; T14 illustrated in FIG. 19). If the ACK signal of the GPIO 20g is changed to the high level within a predetermined time period (Yes in S10), and a process to be requested to the standby SP 2 by the active SP 2 does not exist, the active SP 2 sets, to the low level, the wakeup signal to be transmitted to the standby SP 2 in order to suspend the standby SP 2 (in S11; T18 illustrated in FIG. 19). Then, the sequence managing section 23d of the active SP 2 enqueues the sequence information into the data transfer queue 40 (in S12; T19 illustrated in FIG. 19) and the process of the active SP 2 is completed.

At this time, the standby SP 2 waits for a change in the wakeup signal received by the GPIO 20g from the active SP 2 to the low level (in S26), as illustrated in FIG. 17. If the wakeup signal is changed to the low level, the standby SP 2 sets, to the low level, the ACK signal to be transmitted by the GPIO 20g to the active SP 2 (in S27; T20 illustrated in FIG. 19).

Then, the standby SP 2 executes the suspension process (in S28; T21 illustrated in FIG. 19) and the process of the standby SP 2 is completed.

Returning to FIG. 16, in S10, the ACK signal of the GPIO 20g is not changed to the high level within the predetermined time period in some cases (No in S10). In such a case, the standby SP 2 may be hung up in the resumption process or the like, as indicated by T31 in FIG. 20, for example. In this case, the active SP 2 detects a timeout in waiting for the ACK signal (of the low level) to be received (T32 illustrated in FIG. 20).

In this case, the active SP 2 does not execute the process of synchronizing data with the standby SP 2 and sets the standby SP 2 to an error (error state) in configuration information of the server 1 or the like (in S13; T33 illustrated in FIG. 20), as illustrated in FIG. 16. In addition, the sequence managing section 23d of the active SP 2 clears all entries within the data transfer queue 40 (in S14; T34 illustrated in FIG. 20) and enqueues the sequence information into the data transfer queue 40 (in S12; T35 illustrated in FIG. 20), and the process of the active SP 2 is completed. In this case, the redundant configuration of the SPs 2 is canceled and only the active SP 2 continues to execute the process.

By the aforementioned processes, the sequence is synchronized between the active SP 2 and the standby SP 2. Although the example illustrated in FIGS. 16 to 20 describes the process executed for the sequence registration, the same basically applies to a case where the sequence information of the sequence management queue 23b is updated and a case where a sequence is completed (or a case where the sequence information is removed).

For example, as illustrated in FIG. 21, in the update of the sequence information, the sequence managing section 23d of the active SP 2 searches the sequence management queue 23b for an entry (in S31) and updates data of the entry included in the sequence management queue 23b (in S32)

Other processes (S5 to S11, S13, and S14) are basically the same as or similar to those illustrated in FIG. 16. However, when data is to be enqueued into the data transfer queue 40 (the enqueueing corresponds to S12 illustrated in FIG. 16), the sequence managing section 23d may enqueue differential data into the data transfer queue 40 (in S33).

As illustrated in FIG. 22, when the sequence is completed, the sequence managing section 23d of the active SP 2 searches the sequence management queue 23b for an entry (in S41) and dequeues the entry included in the sequence management queue 23b (in S42).

Other processes (S5 to S11, S13, and S14) are basically the same as or similar to those illustrated in FIG. 16. However, when data is to be enqueued into the data transfer queue 40 (the enqueueing corresponds to S12 illustrated in FIG. 16), the sequence managing section 23d may enqueue, into the data transfer queue 40, the data (differential data) that indicates that the sequence information is to be removed (in S43), for example.

Next, an example of operations in the process of switching between the active and standby SPs by the control system is described with reference to FIGS. 23 to 27.

Figure 23:
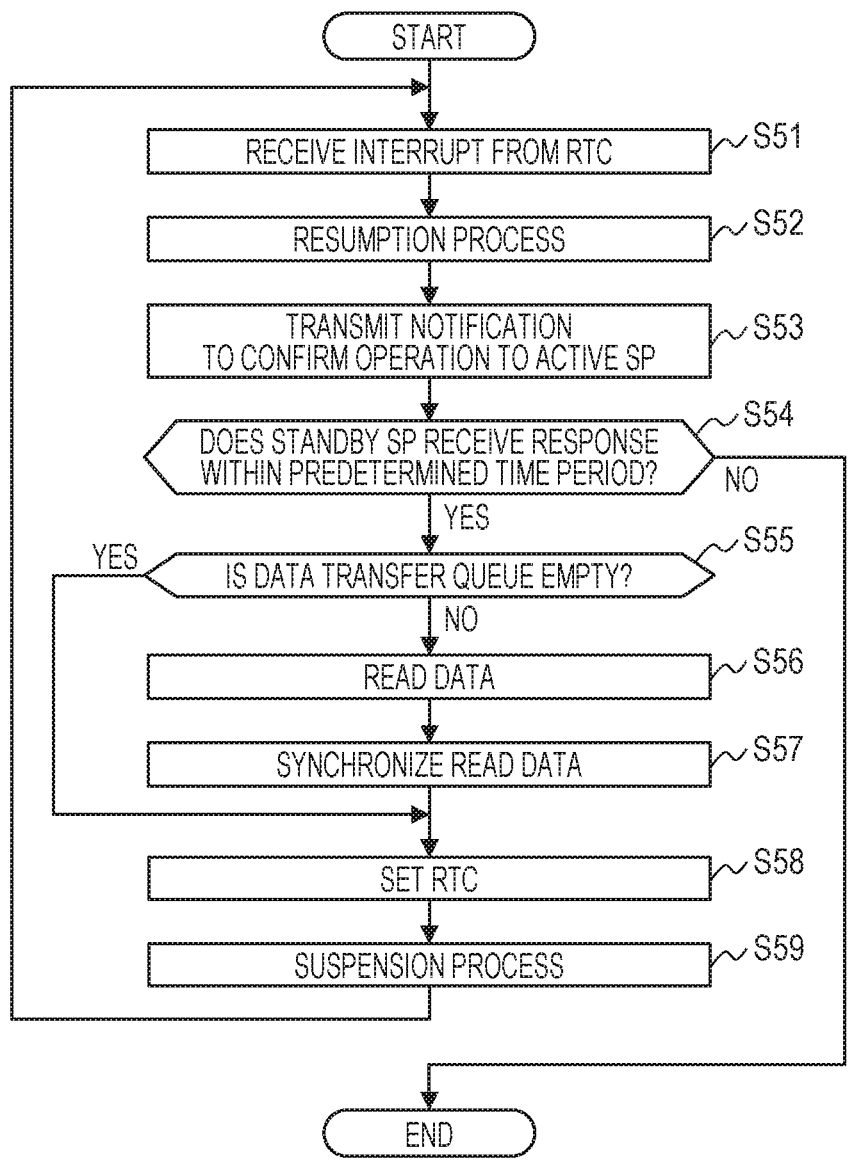
FIG. 23 is a flowchart of an example of operations in a process of monitoring an operation of another SP by a standby SP.
Figure 24:
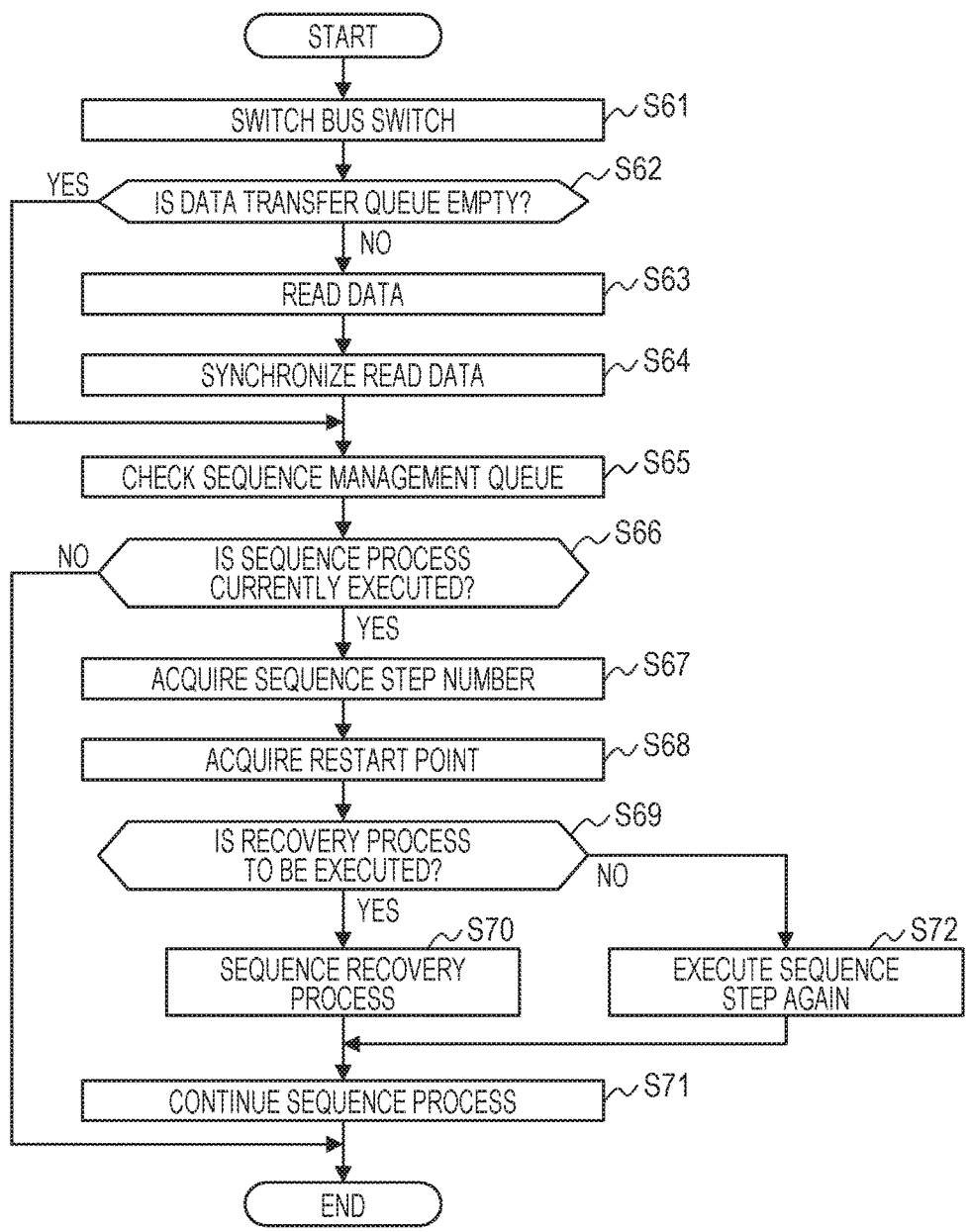
FIG. 24 is a flowchart of an example of operations in a process of switching an active SP by a standby SP.
Figure 25:
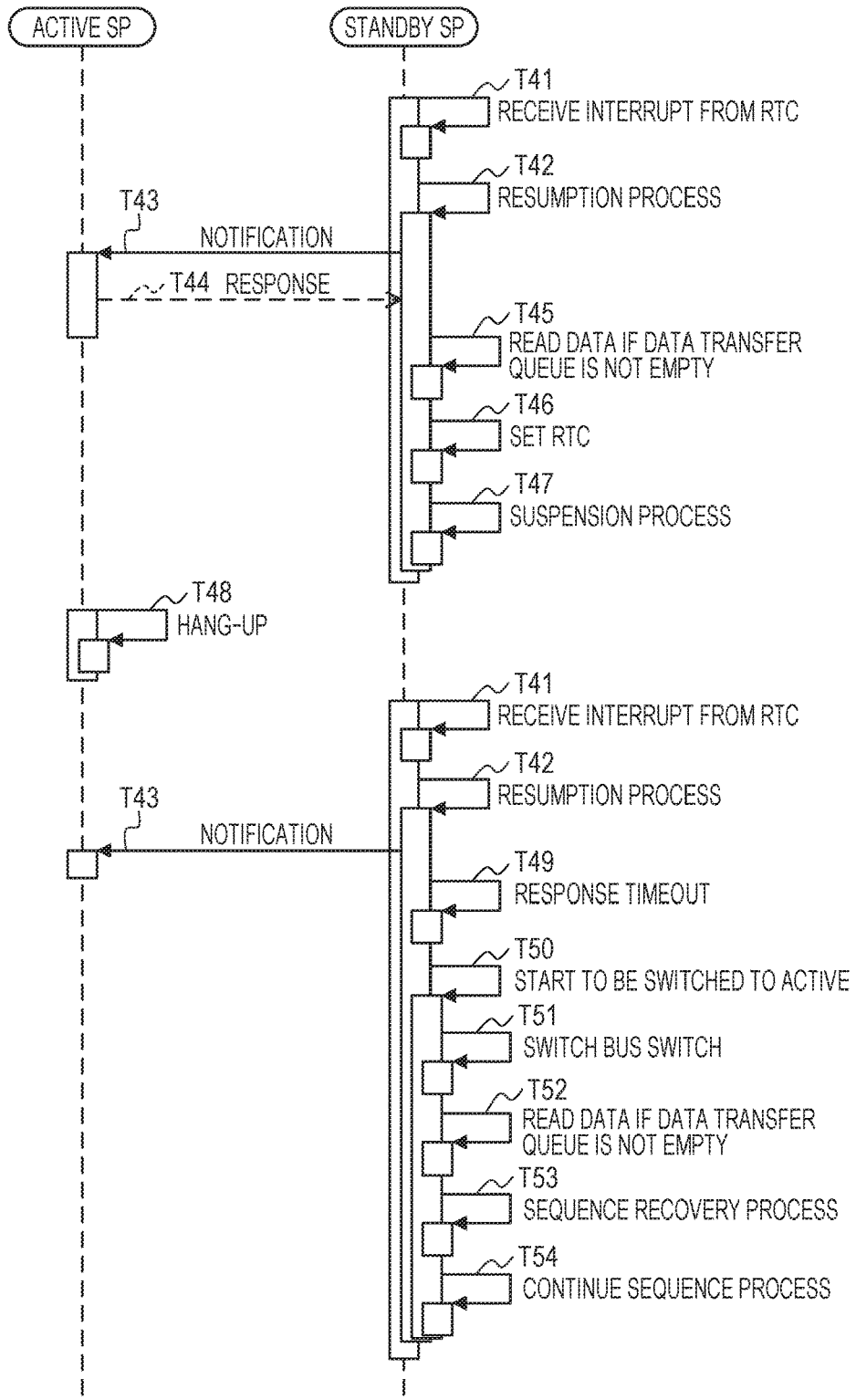
FIG. 25 is a sequence diagram illustrating an example of operations of active and standby SPs when an abnormality occurs in an active SP.
Figure 26:
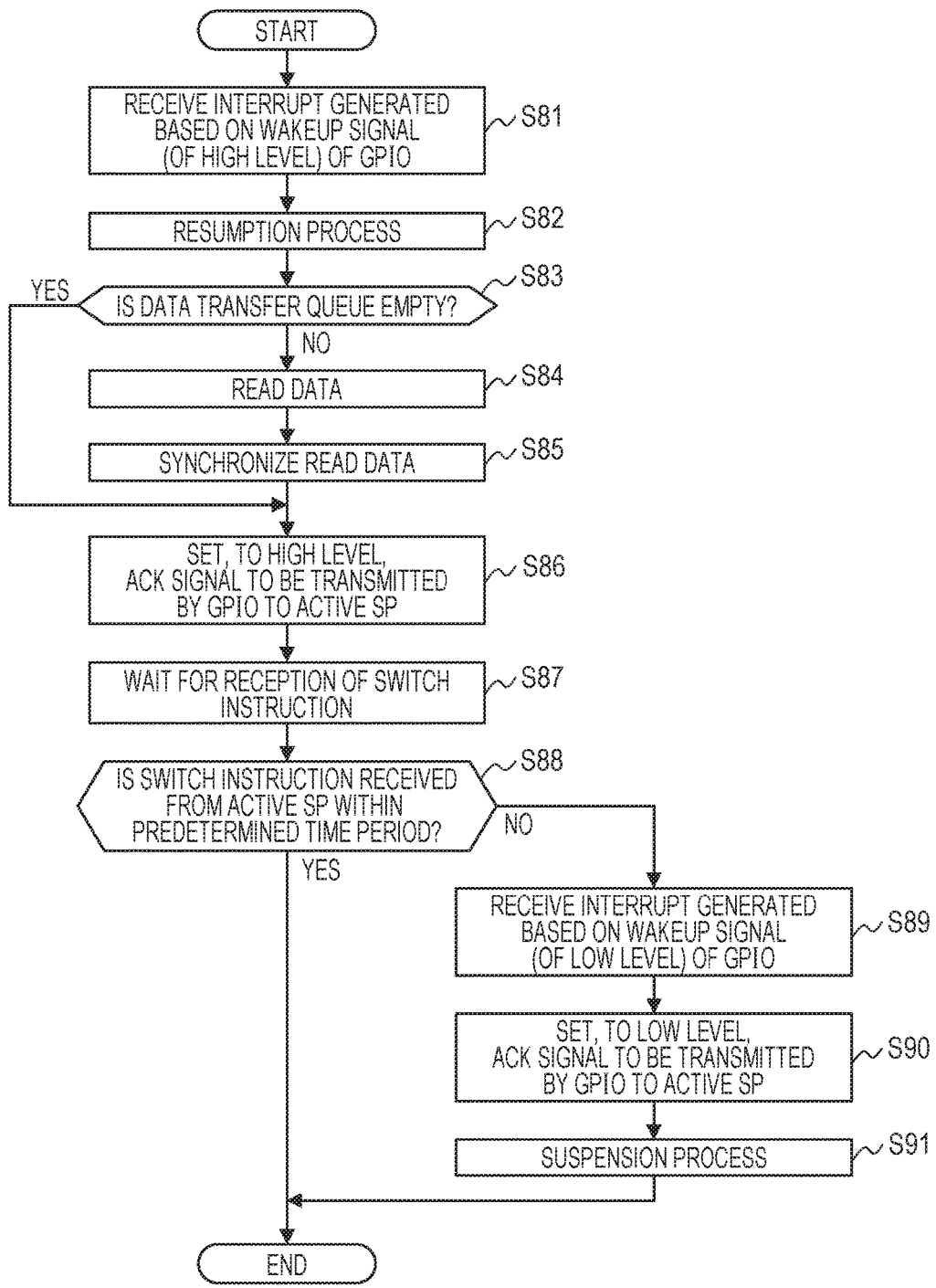
FIG. 26 is a flowchart of an example of operations in a process of monitoring an operation of another SP by a standby SP.
Figure 27:
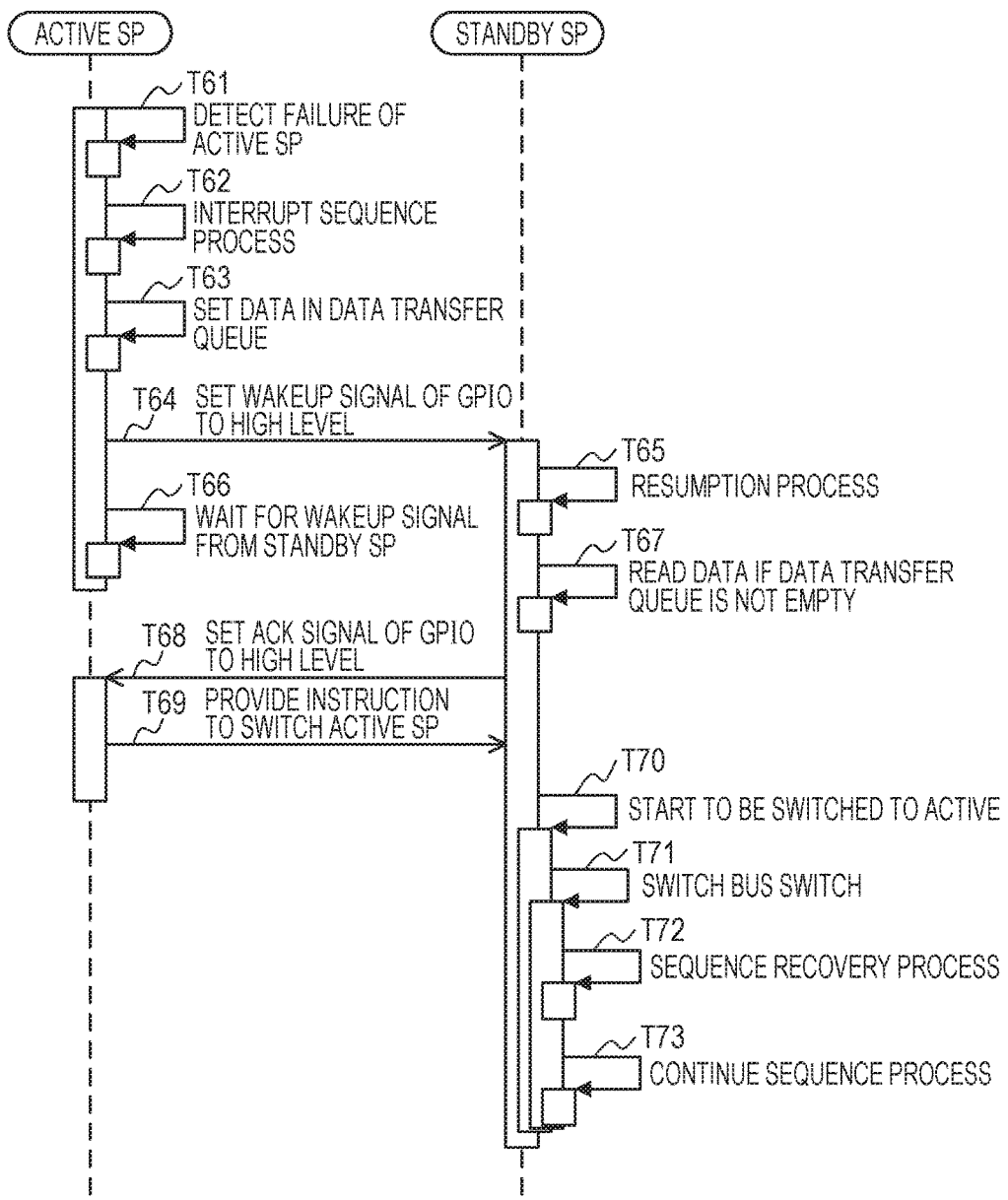
FIG. 27 is a sequence diagram illustrating an example of operations of active and standby SPs when an abnormality occurs in an active SP.

FIGS. 23 and 26 are flowcharts of examples of operations in a process of monitoring an operation of the other SP 2 by the standby SP 2. FIG. 24 is a flowchart of an example of operations in the process of switching the active SP by the standby SP 2. FIGS. 25 and 27 are sequence diagrams illustrating examples of operations of the active and standby SPs when an abnormality occurs in the active SP 2.

As illustrated in FIG. 23, upon receiving an interrupt from the RTC 20b (in S51; T41 illustrated in FIG. 25), the standby SP 2 executes the resumption process (in S52; T42 illustrated in FIG. 25).

Then, the other-system monitoring section 22b of the standby SP 2 transmits, to the active SP 2, a notification to confirm an operation of the active SP 2 through the LAN (in S53; T43 illustrated in FIG. 25), for example, and determines whether or not the standby SP 2 received a response within the predetermined time period (in S54).

Upon receiving the response within the predetermined time period (Yes in S54; T44 illustrated in FIG. 25), the sequence managing section 23*d* determines whether or not the data transfer queue 40 is empty (in S55).

If the data transfer queue 40 is not empty (No in S55), the sequence managing section 23*d* reads data from the data transfer queue 40 (in S56; T45 illustrated in FIG. 25). Then, the sequence managing section 23*d* reflects the read data in the sequence management queue 23*b* to synchronize the read data with the active SP 2 (in S57) and the process proceeds to S58.

In S58, the standby SP 2 sets the RTC 20*b* to ensure that an interrupt is generated after a predetermined time (T46 illustrated in FIG. 25), for example, and executes the suspension process (in S59; T47 illustrated in FIG. 25) and the process proceeds to S51.

If the data transfer queue 40 is empty (Yes in S55), the process proceeds to S58.

The standby SP 2 does not receive the response from the active SP 2 within the predetermined time period (No in S54) in some cases. In such a case, the active SP 2 may be hung up, as indicated by T48 in FIG. 25. In this case, the standby SP 2 detects a timeout in waiting for the response to the notification (T43 illustrated in FIG. 25) to confirm the operation to be received from the active SP 2 (T49 illustrated in FIG. 25) and the process may proceed to the process of switching between the active and standby SPs (T50 illustrated in FIG. 25).

In the switching process, as illustrated in FIG. 24, the standby SP 2 switches the bus switch 20*f* to enable the standby SP 2 to access the SBs 3 and the like (in S61; T51 illustrated in FIG. 25) and determines whether or not the data transfer queue 40 is empty (in S62).

If the data transfer queue 40 is not empty (No in S62), the sequence managing section 23*d* reads data from the data transfer queue 40 (in S63; T52 illustrated in FIG. 25). Then, the sequence managing section 23*d* reflects the read data in the sequence management queue 23*b* to synchronize the read data with the active SP 2 (in S64) and the process proceeds to S65.

If the data transfer queue 40 is empty (Yes in S62), the process proceeds to S65.

The sequence managing section 23*d* of the standby SP 2 checks the sequence management queue 23*b* (in S65), for example, and determines whether or not a sequence process is being executed (in S66). If the sequence process is not being executed (No in S66), a sequence to be taken over from the active SP 2 is not being executed and the switching process is completed.

If the sequence process is being executed (Yes in S66), the sequence managing section 23*d* acquires a sequence step number from the sequence management queue 23*b* (in S67) and acquires a restart point from the sequence table (in S68).

Then, the sequence managing section 23*d* determines, on the basis of the restart point, whether or not the recovery process is to be executed (in S69). For example, if the restart point indicates a sequence step number (step number of the interrupted process) preceding the sequence step number acquired in S67, the sequence managing section 23*d* determines that the recovery process is to be executed (Yes in S69) and the sequence managing section 23*d* executes the process of recovering the sequence (in S70; T53 illustrated in FIG. 25). In addition, the sequence managing section 23*d* continues to execute the sequence process as a new active SP 2 (in S71; T54 illustrated in FIG. 25) and the process of the standby SP 2 (or the new active SP 2) is completed.

If the restart point indicates the same process as the interrupted process, the sequence managing section 23*d* determines that the recovery process is not to be executed (No in S69) and executes the sequence step again (in S72). Thereafter, the process proceeds to S71.

By the aforementioned processes, the active SP 2 and the standby SP 2 are switched. The example illustrated in FIGS. 23 to 25 indicates the processes executed in a case where the active SP 2 is hung up.

As another example, an example of operations of the active and standby SPs 2 when a failure is detected by the own-board monitoring section 21*a* of the active SP 2 is described below.

For example, as illustrated in FIG. 27, if the own-board monitoring section 21*a* of the active SP 2 detects a failure of the hardware of the own SP 2 (in T61), the own-board monitoring section 21*a* of the active SP 2 notifies the sequence processing section 23 of the failure. The sequence processing section 23 (sequence managing section 23*d*) interrupts a currently executed sequence process (in T62), and sets data (sequence information) related to the interrupted sequence in the data transfer queue 40 (in T63). The active SP 2 sets the wakeup signal of the GPIO 20*g* to the high level (in T64) in order to switch the active SP and waits for the completion of the resumption of the standby SP 2 (in T66).

As illustrated in FIG. 26, upon receiving an interrupt generated on the basis of the wakeup signal (of the high level) of the GPIO 20*g* (in S81), the standby SP 2 executes the resumption process in response to the interrupt (in S82; T65 illustrated in FIG. 27).

Then, the sequence managing section 23*d* of the standby SP 2 determines whether or not the data transfer queue 40 is empty (in S83). If the data transfer queue 40 is not empty (No in S83), the sequence managing section 23*d* reads data from the data transfer queue 40 (in S84; T67 illustrated in FIG. 27). Then, the sequence managing section 23*d* reflects the read data in the sequence management queue 23*b* to synchronize the sequence management queue 23*b* with the active SP 2 (in S85) and the process proceeds to S86.

If the data transfer queue 40 is empty (Yes in S83), the process proceeds to S86.

In S86, the standby SP 2 sets the ACK signal of the GPIO 20*g* to the high level (in T68 illustrated in FIG. 27).

The active SP 2 recognizes the completion of the resumption of the standby SP 2 on the basis of the ACK signal and transmits, to the standby SP 2, an instruction to switch the active SP (in T69 illustrated in FIG. 27).

The standby SP 2 waits for reception of the switch instruction (in S87 and S88). When the standby SP 2 receives the switch instruction from the active SP within the predetermined time period (Yes in S88), the process proceeds to the process of switching the active SP, which is illustrated in FIG. 24. For example, in the example illustrated in the sequence diagram of FIG. 27, the standby SP 2 starts to be switched to active (in T70) and switches the bus switch (in T71) to acquire the right of access to the SBs 3. Then, the sequence processing section 23 uses the synchronized sequence management queue 23*b* to execute the sequence recovery process (or execute a sequence step again) (in T72), and continues to execute the sequence process (in T73).

If the standby SP 2 does not receive the switch instruction from the active SP within the predetermined time period (No in S88), the standby SP 2 waits for an interrupt generated on the basis of the wakeup signal (of the low level) of the GPIO 20g. Upon receiving the interrupt generated on the basis of the wakeup signal (of the low level) of the GPIO 20g (in S89), the standby SP 2 sets, to the low level, the ACK signal to be transmitted by the GPIO 20g to the active SP 2 (in S90) and executes the suspension process (in S91). Thus, the standby SP 2 transitions to the suspended state and the process of the standby SP 2 is completed.

In the case of NO in S88, a situation may be considered in which the standby SP 2 does not receive the switch instruction from the active SP 2 within the predetermined time period due to the hang-up of the active SP 2, for example. In this case, the switching process is not executed in the process illustrated in FIG. 26, but the standby SP 2 may detect the hang-up of the active SP 2 and appropriately execute the switching process, as described with reference to FIG. 23.

As described with reference to FIGS. 23 to 27, while the standby SP 2 is in the suspended state in which the standby SP 2 stops operating, the standby SP 2 starts operating at a predetermined timing and monitors the active SP 2. If the standby SP 2 detects an abnormality of the active SP 2, the standby SP 2 may take over, from the active SP 2, the execution of a sequence (multiple processes (steps)) on the SBs 3 and the like. The predetermined timing is when the wakeup signal (of the high level) of the GPIO 20g is generated or an interrupt is generated by the RTC 20b, for example.

In the server 1 according to the embodiment, the active SP 2 may reflect, in the memory 2b and the EEPROM 4, state information indicating a state of a step to be executed in a sequence. In addition, the active SP 2 may transmit, to the standby SP 2, a start notification that causes an operation of the standby SP 2 to be started. Furthermore, when the standby SP 2 receives the start notification from the active SP 2 in the state in which an operation of the standby SP 2 is stopped, the standby SP 2 may start the operation, read the state information from the EEPROM 4 and reflect the read state information in the memory 2b.

In the aforementioned manner, the control system includes the EEPROM 4 which is provided for the data synchronization and is accessible from both active and standby SPs, and the GPIOs 20g which is provided for control of the suspension and resumption of the standby SP 2. Thus, even if an operation of the standby SP 2 is stopped (suspended), the active SP 2 may cause data to be stored in the EEPROM 4 and synchronize the data within the EEPROM 4 with the standby SP 2 by activating (resuming) the standby SP 2 using the start notification provided by the GPIO 20g.

Thus, the standby SP 2 may be suspended in the system having the redundant configuration of the SPs 2, and power to be consumed by the standby SP 2 may be reduced.

Immediately after the standby SP 2 in the suspended state is switched to active, the newly switched active SP 2 may take over a sequence process such as the process of power-on and execute the recovery process. The switching between the active and standby SPs may be executed within a time period equal to or nearly equal to a time period of switching between active and standby SPs in a case where the standby SP 2 is not suspended. Thus, a reduction in the performance of the system that is caused by the suspended state of the standby SP 2 may be suppressed.

The GPIOs 20g are connected to each other through the signal lines. An interrupt is generated on the CPU 2a of the standby SP 2 that received the wakeup signal. Thus, the standby SP 2 may become the suspended state in which components within the standby SP 2, such as the CPU 2a and the like, are stopped, and the standby SP 2 may be resumed at a time desired by the active SP 2.

The embodiment is not limited to the above description and may be variously modified and changed without departing from the gist of the embodiment.

For example, the server 1 includes two SPs 2, but is not limited to this. The server 1 may include an arbitrary number of SPs 2.

Arbitrary two or more of the functional blocks of the SPs 2 illustrated in FIG. 3 may be combined or integrated, and at least one of the functional blocks of the SPs 2 illustrated in FIG. 3 may be divided.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A control system, comprising:
a first control device and a second control device that are made redundant and configured to execute processes on a target device in a predetermined execution order; and
a transfer storage unit accessible from the first control device and the second control device,
wherein
the first control device includes:
a first storage unit configured to store therein information to be used for the execution of the processes, and
a first processor configured to
reflect state information in the first storage unit and the transfer storage unit, the state information indicating a state of a process to be executed among the processes, and
transmit, to the second control device, a start notification that causes the second control device to start an operation of the second control device,
the second control device includes:
a second storage unit configured to store therein information to be used for the execution of the processes, and
a second processor configured to
start the operation of the second control device in response to reception of the start notification from the first control device when the second control device is in a suspended state in which the operation of the second control device is stopped,
read the state information from the transfer storage unit, and
reflect the read state information in the second storage unit.

2. The control system according to claim 1, wherein the second processor is configured to
start, when the second control device is in the suspended state, the operation of the second control device at a predetermined timing,
monitor the first control device, and take over the execution of the processes from the first control device upon detecting an abnormality of the first control device.

3. The control system according to claim 2, wherein
the first and second storage units are configured to store therein restart information that indicates respective restart points of the processes in cases where the processes are interrupted during the execution of the processes, and
the second processor is configured to execute, upon detecting the abnormality of the first control device, a first process indicated by a first restart point corresponding to a second process which has been executed by the first control device and interrupted during the execution of the second process, on basis of the state information stored in the second storage unit and the restart information stored in the second storage unit.

4. The control system according to claim 2, wherein
the second processor is configured to
stop the operation of the second control device if the second control device does not detect the abnormality of the first control device.

5. The control system according to claim 1, wherein
the first processor is configured to
transmit the start notification to the second control device when an available storage region of the transfer storage unit is smaller than a predetermined threshold,
the second processor is configured to
read the state information from the transfer storage unit in response to the start notification,
reflect the read state information in the second storage unit, and
transmit a response to the first control device, and
the first processor is configured to
receive the response from the second control device, and
transmit, to the second control device, a stop notification that causes the operation of the second control device to be stopped.

6. The control system according to claim 1, wherein
the first processor is configured to transmit the start notification through a signal line connecting the first control device and the second control device to each other, and
the second processor is configured to be interrupted in response to the reception of the start notification.

7. A processing method of a control system including a first control device and a second control device that are made redundant and configured to execute processes on a target device in a predetermined execution order, the processing method comprising:
reflecting, by the first control device, state information in a transfer storage unit and a first storage unit, the state information indicating a state of a process to be executed among the processes, the transfer storage unit being accessible from the first control device and the second control device, the first storage unit being included in the first control device;
transmitting to the second control device, by the first control device, a start notification that causes the second control device to start an operation of the second control device;
starting, by the second control device, the operation of the second control device in response to reception of the start notification from the first control device when the second control device is in a suspended state in which the operation of the second control device is stopped;
reading, by the second control device, the state information from the transfer storage unit; and
reflecting, by the second control device, the read state information in a second storage unit included in the second control device.

8. The processing method according to claim 7, further comprising:
starting by the second control device, when the second control device is in the suspended state, the operation of the second control device at a predetermined timing;
monitoring the first control device by the second control device; and
taking over, by the second control device, the execution of the processes from the first control device upon detecting an abnormality of the first control device.

9. The processing method according to claim 8, wherein
the first and second storage units are configured to store therein restart information that indicates respective restart points of the processes in cases where the processes are interrupted during the execution of the processes, and
the processing method further comprises:
executing by the second control device, upon detecting the abnormality of the first control device, a first process indicated by a first restart point corresponding to a second process which has been executed by the first control device and interrupted during the execution of the second process, on basis of the state information stored in the second storage unit and the restart information stored in the second storage unit.

10. The processing method according to claim 8, further comprising:
stopping, by the second control device, the operation of the second control device if the second control device does not detect the abnormality of the first control device.

11. The processing method according to claim 7, further comprising:
transmitting, by the first control device, the start notification to the second control device when an available storage region of the transfer storage unit is smaller than a predetermined threshold;
reading, by the second control device, the state information from the transfer storage unit in response to the start notification;
reflecting, by the second control device, the read state information in the second storage unit;
transmitting, by the second control device, a response to the first control device;
receiving, by the first control device, the response from the second control device; and
transmitting by the first control device, to the second control device, a stop notification that causes the operation of the second control device to be stopped.

12. The processing method according to claim 7, further comprising:
transmitting, by the first control device, the start notification through a signal line connecting the first control device and the second control device to each other; and
causing, by the second control device, a processor to be interrupted in response to the reception of the start notification, the processor being included in the second control device.

13. A control system for at least one target device, comprising:
a transfer storage unit accessible from the first and second control devices a first control device, configured to execute processes on the target device in a predetermined execution order, including
  a first storage unit configured to store therein information to be used for execution of the processes, and
  a first processor configured to
    reflect state information in the first storage unit and the transfer storage unit, the state information indicating a state of a process to be executed among the processes, and
    transmit a start notification; and
a second control device, providing redundancy for the first control device and configured to execute processes on the target device in a predetermined execution order, including
  a second storage unit configured to store therein information to be used for the execution of the processes, and
  a second processor configured to
    start the operation of the second control device in response to reception of the start notification from the first control device when the second control device is in a suspended state in which the operation of the second control device is stopped,
    read the state information from the transfer storage unit,
    reflect the read state information in the second storage unit, and
    take over the execution of the processes from the first control device upon detection of an abnormality of the first control device.

* * * * *